United States Patent
Matsumoto et al.

(10) Patent No.: US 9,759,117 B2
(45) Date of Patent: Sep. 12, 2017

(54) DIAGNOSTIC SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Arifumi Matsumoto, Gotenba (JP); Toru Kidokoro, Hadano (JP); Taiga Hagimoto, Susono (JP); Makoto Ogiso, Mishima (JP); Kenji Furui, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/976,335

(22) Filed: Dec. 21, 2015

(65) Prior Publication Data
US 2016/0177804 A1 Jun. 23, 2016

(30) Foreign Application Priority Data
Dec. 22, 2014 (JP) .................................. 2014-259443

(51) Int. Cl.
*F01N 3/00* (2006.01)
*F01N 3/02* (2006.01)
(Continued)

(52) U.S. Cl.
CPC ............ *F01N 11/002* (2013.01); *F01N 3/035* (2013.01); *F01N 3/0814* (2013.01);
(Continued)

(58) Field of Classification Search
CPC ........ F01N 11/00; F01N 11/002; F01N 3/035; F01N 3/0814; F01N 3/0821;
(Continued)

(56) References Cited

U.S. PATENT DOCUMENTS

2010/0122525 A1   5/2010   Fujita et al.
2011/0030348 A1*  2/2011   Crawford ................ F01N 3/103
                                                                   60/277
(Continued)

FOREIGN PATENT DOCUMENTS

JP    2010-121478    6/2010
JP    2011-220232    11/2011
WO    WO 2014/087536 A1    6/2014

*Primary Examiner* — Mark Laurenzi
*Assistant Examiner* — Dapinder Singh
(74) *Attorney, Agent, or Firm* — Finnegan, Henderson, Farabow, Garrett & Dunner, LLP

(57) ABSTRACT

A diagnostic system for an internal combustion engine is disclosed. The diagnostic system may include an electronic control unit. The electronic control unit may determine whether a predetermined condition is satisfied. The predetermined condition may be a condition under which an amount of particulate matter that separates from a filter is larger than or equal to a predetermined separation amount as a urea water-originated deposit once accumulated in the filter separates in gaseous form. When the electronic control unit determines that the predetermined condition is satisfied, the electronic control unit may not execute a diagnosis of a malfunction in the filter based on a filter differential pressure until a predetermined period elapses from the point in time at which it is determined that the predetermined condition is satisfied.

20 Claims, 16 Drawing Sheets

(51) Int. Cl.
*F01N 3/10* (2006.01)
*F01N 3/20* (2006.01)
*F01N 11/00* (2006.01)
*F01N 3/08* (2006.01)
*F01N 9/00* (2006.01)
*F01N 3/035* (2006.01)

(52) U.S. Cl.
CPC ........... *F01N 3/0821* (2013.01); *F01N 3/208* (2013.01); *F01N 3/2066* (2013.01); *F01N 9/00* (2013.01); *F01N 11/00* (2013.01); *F01N 2250/02* (2013.01); *F01N 2550/04* (2013.01); *F01N 2560/08* (2013.01); *F01N 2900/0418* (2013.01); *F01N 2900/0422* (2013.01); *F01N 2900/1402* (2013.01); *F01N 2900/1602* (2013.01); *F01N 2900/1606* (2013.01); *Y02T 10/24* (2013.01); *Y02T 10/47* (2013.01)

(58) Field of Classification Search
CPC .......... F01N 3/2066; F01N 3/208; F01N 9/00; F01N 2250/02; F01N 2550/04; F01N 2560/08; F01N 2900/0418; F01N 2900/0422; F01N 2900/1402; F01N 2900/1602; F01N 2900/1606; Y02T 10/24; Y02T 10/47
USPC .................................. 60/274, 277, 297, 311
See application file for complete search history.

(56) References Cited

U.S. PATENT DOCUMENTS

| | | |
|---|---|---|
| 2013/0028792 A1 | 1/2013 | Yano et al. |
| 2014/0331752 A1* | 11/2014 | Hall ........................ F01N 11/00 73/114.75 |
| 2015/0315950 A1 | 11/2015 | Hagimoto |
| 2016/0222850 A1* | 8/2016 | Ota ........................ F01N 3/106 |

* cited by examiner

DIAGNOSTIC SYSTEM FOR INTERNAL COMBUSTION ENGINE

INCORPORATION BY REFERENCE

The disclosure of Japanese Patent Application No. 2014-259443 filed on Dec. 22, 2014 including the specification, drawings and abstract is incorporated herein by reference in its entirety.

BACKGROUND

1. Technical Field

The invention relates to a diagnostic system for an internal combustion engine including a filter that is provided in an exhaust passage of the internal combustion engine and that collects particulate matter (PM) in exhaust gas.

2. Background

There is known a technique that a filter that collects PM in exhaust gas is provided in an exhaust passage of an internal combustion engine. A malfunction, such as melting damage and breakage, may occur in the filter. When such a malfunction of the filter occurs, the amount of PM that is not collected by the filter and that flows out from the filter increases. Such a malfunction of the filter leads to an increase in the amount of PM that is released to the atmosphere. There has been developed a technique for detecting a pressure difference in exhaust gas between the upstream side and downstream side of a filter (hereinafter, which may also be referred to as "filter differential pressure") and then diagnosing on the basis of the filter differential pressure whether there is a malfunction in the filter.

There is also known a configuration that a urea water addition device and a selective reduction NOx catalyst (hereinafter, which may also be referred to as "SCR catalyst") are provided in an exhaust passage of an internal combustion engine. With this configuration, urea added from the urea water addition device hydrolyzes to produce ammonia. NOx in exhaust gas is reduced in the SCR catalyst by using the ammonia as a reducing agent. Japanese Patent Application Publication No. 2010-121478 (JP 2010-121478 A) describes that, with the above configuration, a deposit originated from urea water added from the urea water addition device (hereinafter, which may also be referred to as "urea deposit") may accumulate in the exhaust passage. Japanese Patent Application Publication No. 2011-220232 (JP 2011-220232 A) describes means for estimating the accumulation amount of urea deposit in an exhaust system.

SUMMARY

There is a case where a filter is provided in addition to the SCR catalyst in the exhaust passage of the internal combustion engine at a portion downstream of the urea water addition device. With this configuration, not only PM emitted from the internal combustion engine but also a urea deposit may accumulate in the filter. A urea deposit that has once accumulated in the filter may vaporize or become ammonia gas into gaseous form to separate from the filter. It has been found that there is a case where the filter differential pressure fluctuates because of such a behavior of a urea deposit.

This disclosure provides a diagnostic system for an internal combustion engine, which reduces erroneous diagnosis at the time of carrying out a diagnosis of a malfunction in a filter on the basis of a filter differential pressure in the configuration that the filter is provided in an exhaust passage of the internal combustion engine in addition to an SCR catalyst at a portion downstream of a urea water addition device.

A urea deposit accumulated in the filter provided in the exhaust passage at a portion downstream of the urea water addition device vaporizes or becomes ammonia gas into gaseous form to separate from the filter at a temperature lower than the oxidation temperature of particulate matter. When particulate matter accumulates so as to overlap with a urea deposit on the filter, the particulate matter also separates from the filter with the separation of the urea deposit. As a result, it is found that, even when the filter is in the normal state and the temperature of the filter has not reached the oxidation temperature of the particulate matter, the filter differential pressure may decrease. Disclosed embodiments carry out a diagnosis of a malfunction in the filter in consideration of a decrease in filter differential pressure due to the separation of particulate matter with the separation of a urea deposit.

An example aspect of the disclosure provides a diagnostic system for an internal combustion engine. The internal combustion engine includes an exhaust gas control system and an exhaust passage. The exhaust gas control system includes a filter, a selective reduction NOx catalyst and a urea water addition device. The filter provided in the exhaust passage. The filter is configured to collect particulate matter in exhaust gas. The selective reduction NOx catalyst is provided in the exhaust passage. The selective reduction NOx catalyst is configured to reduce NOx in exhaust gas by using ammonia as a reducing agent. The urea water addition device is provided in the exhaust passage at a portion upstream of the filter and the selective reduction NOx catalyst. The urea water addition device is configured to add urea water into exhaust gas. The diagnostic system includes a differential pressure acquisition device and an electronic control unit. The differential pressure acquisition device is configured to acquire a filter differential pressure. The filter differential pressure is a pressure difference in exhaust gas between an upstream side and downstream side of the filter. The electronic control unit is configured to: (i) calculate a first estimated amount by using a parameter other than the filter differential pressure, the first estimated amount is an estimated amount of particulate matter accumulated in the filter; (ii) set a determination differential pressure based on the first estimated amount; (iii) execute a malfunction diagnosis process for diagnosing, when the filter differential pressure is smaller than the determination differential pressure, that there is a malfunction in the filter; (iv) determine whether a predetermined condition is satisfied, the predetermined condition is a condition under which an amount of separated particulate matter is larger than or equal to a predetermined separation amount, the separated particulate matter is particulate matter that separates from the filter as a urea water-originated deposit once accumulated in the filter separates from the filter in gaseous form; and (v) when the predetermined condition is satisfied, not execute the malfunction diagnosis process until a predetermined period elapses from a point in time at which the predetermined condition is satisfied.

When a malfunction of the filter occurs, the filter differential pressure that is acquired by the differential pressure acquisition device decreases as compared to when the filter is in a normal state. Therefore, by comparing the filter differential pressure, which is acquired by the differential pressure acquisition device, with the determination differential pressure, it is possible to diagnose whether there is a malfunction in the filter. With the above configuration, when the filter differential pressure is smaller than the determination differential pressure, it is diagnosed that there is a malfunction in the filter. At this time, if the malfunction diagnosis process is executed when the filter differential pressure has significantly decreased because of the fact that particulate matter separates from the filter with the separation of a urea deposit, it may be erroneously diagnosed that there is a malfunction in the filter although the filter is actually in the normal state.

With the above configuration, it is determined whether the predetermined condition is satisfied. The predetermined condition is a condition under which the amount of separated particulate matter, which is particulate matter that separates from the filter with the separation of a urea deposit, can be larger than or equal to the predetermined separation amount. Here, the predetermined separation amount is a threshold of the amount of the separated particulate matter, at or above which it may be determined that the amount of decrease in filter differential pressure due to the separation of particulate matter is larger than an allowable amount.

When it is determined that the predetermined condition is satisfied, the malfunction diagnosis process is not executed until the predetermined period elapses from the point in time at which the determination is made. In other words, when it is determined that the predetermined condition is satisfied, the malfunction diagnosis process is executed after a lapse of the predetermined period from the point in time at which the determination is made. The separated particulate matter that has separated from the filter with the separation of a urea deposit is collected again by the filter. In the filter, particulate matter newly flowing into the filter (hereinafter, which may also be referred to as "inflow particulate matter") is continuously collected. Therefore, even when the filter differential pressure has once decreased because of the fact that particulate matter separates from the filter with the separation of a urea deposit, the filter differential pressure recovers because separated particulate matter or inflow particulate matter accumulates in the filter. The above-described predetermined period is a period set to a length longer than or equal to a period that is estimated to be minimally required from the beginning of a decrease in the filter differential pressure due to the separation of particulate matter from the filter to the recovery of the filter differential pressure. The length of the predetermined period may be a predetermined constant length or may be changed as will be described later.

With the above configuration, it is possible to avoid execution of the malfunction diagnosis process in a state where there is a possibility of occurrence of an erroneous diagnosis. Therefore, it is possible to reduce erroneous diagnosis in the case where a diagnosis of a malfunction in the filter is carried out on the basis of the filter differential pressure.

Another example aspect of the disclosure provides a diagnostic system for an internal combustion engine. The internal combustion engine includes an exhaust gas control system and an exhaust passage. The exhaust gas control system includes a filter and a selective reduction NOx catalyst and a urea water addition device. The filter is provided in the exhaust passage. The filter is configured to collect particulate matter in exhaust gas. The selective reduction NOx catalyst is provided in the exhaust passage. The selective reduction NOx catalyst is configured to reduce NOx in exhaust gas by using ammonia as a reducing agent. The urea water addition device is provided in the exhaust passage at a portion upstream of the filter and the selective reduction NOx catalyst. The urea water addition device is configured to add urea water into exhaust gas. The diagnostic system includes a differential pressure acquisition device and an electronic control unit. The differential pressure acquisition device is configured to acquire a filter differential pressure. The filter differential pressure is a pressure difference in exhaust gas between an upstream side and downstream side of the filter. The electronic control unit is configured to: (i) calculate a first estimated amount by using a parameter other than the filter differential pressure, the first estimated amount is an estimated amount of particulate matter accumulated in the filter; (ii) set a determination differential pressure based on the first estimated amount; (iii) execute a malfunction diagnosis process for diagnosing, when the filter differential pressure is smaller than the determination differential pressure, that there is a malfunction in the filter; (iv) determine whether a predetermined condition is satisfied, the predetermined condition is a condition under which an amount of separated particulate matter is larger than or equal to a predetermined separation amount, the separated particulate matter is particulate matter that separates from the filter as a urea water-originated deposit once accumulated in the filter separates from the filter in gaseous form; and (v) in a period until a lapse of a predetermined period from a point in time at which the predetermined condition is satisfied, correct at least one of the filter differential pressure and the determination differential pressure for the first estimated amount at a time of executing the malfunction diagnosis process, and execute the malfunction diagnosis process, the filter differential pressure is corrected such that the filter differential pressure when the predetermined condition is satisfied is larger than the filter differential pressure when the predetermined condition is not satisfied, and the determination differential pressure is corrected such that the determination differential pressure when the predetermined condition is satisfied is smaller than the determination differential pressure when the predetermined condition is not satisfied.

With the above configuration, when it is determined that the predetermined condition is satisfied, and when the malfunction diagnosis process is executed in the period until the predetermined period elapses from the point in time at which the determination is made, at least any one of the determination differential pressure or the filter differential pressure is corrected. At this time, when the determination differential pressure is corrected, the determination differential pressure is corrected to a smaller value with respect to the first estimated amount as compared to the case where it is determined that the predetermined condition is not satisfied. When the filter differential pressure is corrected, the filter differential pressure is corrected to a larger value as compared to the case where it is determined that the predetermined condition is not satisfied.

The above-described correction is carried out and then the malfunction diagnosis process is executed. Thus, even when the filter differential pressure has decreased because of the fact that particulate matter separates from the filter, it is difficult to be diagnosed that there is a malfunction in the filter as compared to the case where the malfunction diagnosis process is executed without any correction. Therefore, according to the second aspect as well, it is possible to reduce erroneous diagnosis in the case where a diagnosis of a malfunction in the filter is carried out on the basis of the filter differential pressure.

As the temperature of the filter rises, the separation of a urea deposit accumulated in the filter is facilitated. Therefore, as the temperature of the filter rises, the amount of separated particulate matter that separates from the filter increases with the separation of a urea deposit. When a urea deposit has separated from the filter, the amount of separated particulate matter that separates from the filter also increases accordingly as the particulate matter accumulation amount in the filter increases. In the diagnostic system, the predetermined condition may be a condition that a temperature of the filter is higher than or equal to a predetermined temperature and the first estimated amount is larger than or equal to a first predetermined amount. The electronic control unit may be configured to set at least one of the predetermined temperature and the first predetermined amount. The predetermined temperature may be set such that the predetermined temperature when the first estimated amount is large is lower than the predetermined temperature when the first estimated amount is small. The first predetermined amount may beset such that the first predetermined amount when the first estimated amount is large is smaller than the first predetermined amount when the first estimated amount is small.

When a urea deposit has separated from the filter, the amount of separated particulate matter that separates from the filter increases accordingly as the amount of urea deposit accumulated in the filter increases. In the diagnostic system, the electronic control unit may be configured to calculate a second estimated amount, the second estimated amount is an estimated amount of urea water-originated deposit accumulated in the filter. The electronic control unit may be configured to set at least one of the predetermined temperature and the first predetermined amount. The predetermined temperature may be set such that the predetermined temperature when the second estimated amount is large is lower than the predetermined temperature when the second estimated amount is small. The first predetermined amount may be set such that the first predetermined amount when the second estimated amount is large is smaller than the first predetermined amount when the second estimated amount is small.

In the diagnostic system, the electronic control unit may be configured to calculate a second estimated amount, the second estimated amount is an estimated amount of urea water-originated deposit accumulated in the filter. The predetermined condition may be a condition that a temperature of the filter is higher than or equal to a predetermined temperature and the second estimated amount is larger than or equal to a second predetermined amount. The electronic control unit may be configured to set at least one of the predetermined temperature and the second predetermined amount. The predetermined temperature is set such that the predetermined temperature when the second estimated amount is large is lower than the predetermined temperature when the second estimated amount is small, and the second predetermined amount is set such that the second predetermined amount when the second estimated amount is large is smaller than the second predetermined amount when the second estimated amount is small.

In the diagnostic system, the electronic control unit may be configured to set at least one of the predetermined temperature and the second predetermined amount. The predetermined temperature may be set such that the predetermined temperature when the first estimated amount is large is lower than the predetermined temperature when the first estimated amount is small. The second predetermined amount may be set such that the second predetermined amount when the first estimated amount is large is smaller than the second predetermined amount when the first estimated amount is small.

In the diagnostic system, the electronic control unit may be configured to, when the electronic control unit determines that the predetermined condition is satisfied, correct at least one of the determination differential pressure and the filter differential pressure. The determination differential pressure may be corrected such that a correction amount of the determination differential pressure at the time when the electronic control unit estimates that the amount of the separated particulate matter is large when the predetermined condition is satisfied is larger than a correction amount of the determination differential pressure at the time when the electronic control unit estimates that the amount of the separated particulate matter is small when the predetermined condition is satisfied. The filter differential pressure may be corrected such that a correction amount of the filter differential pressure at the time when the electronic control unit estimates that the amount of the separated particulate matter is large when the predetermined condition is satisfied is larger than a correction amount of the filter differential pressure at the time when the electronic control unit estimates that the amount of the separated particulate matter is small when the predetermined condition is satisfied.

For example, it is estimated that the amount of separated particulate matter increases as the temperature of the filter rises. In the diagnostic system, the electronic control unit may be configured to, in the predetermined period, correct at least one of the determination differential pressure and the filter differential pressure. The determination differential pressure may be corrected such that a correction amount of the determination differential pressure at the time when a temperature of the filter at a point in time at which the predetermined condition is satisfied is high is larger than a correction amount of the determination differential pressure at the time when the temperature of the filter is low at the point in time at which the predetermined condition is satisfied. The filter differential pressure may be corrected such that a correction amount of the filter differential pressure at the time when a temperature of the filter at a point in time at which the predetermined condition is satisfied is high is larger than a correction amount of the filter differential pressure at the time when the temperature of the filter is low at the point in time at which the predetermined condition is satisfied.

It is estimated that the amount of separated particulate matter increases as the first estimated amount increases. In the diagnostic system, the electronic control unit may be configured to, in the predetermined period, correct at least one of the determination differential pressure and the filter differential pressure. The determination differential pressure may be corrected such that a correction amount of the determination differential pressure at the time when the first estimated amount at a point in time at which the predetermined condition is satisfied is large is larger than a correction amount of the determination differential pressure at the time when the first estimated amount at the point in time at which the predetermined condition is satisfied is small. The filter differential pressure may be corrected such that a correction amount of the filter differential pressure at the time when the first estimated amount at a point in time at which the predetermined condition is satisfied is large is larger than a correction amount of the filter differential pressure at the time when the first estimated amount at the point in time at which the predetermined condition is satisfied is small.

It is estimated that the amount of separated particulate matter increases as the second estimated amount increases. In the diagnostic system, the electronic control unit may be configured to calculate a second estimated amount. The second estimated amount may be an estimated amount of urea water-originated deposit accumulated in the filter. The electronic control unit may be configured to, in the predetermined period, correct at least one of the determination differential pressure and the filter differential pressure. The determination differential pressure may be corrected such that a correction amount of the determination differential pressure at the time when the second estimated amount at a point in time at which the predetermined condition is satisfied is large is larger than a correction amount of the determination differential pressure at the time when the second estimated amount at the point in time at which the predetermined condition is satisfied is small. The filter differential pressure may be corrected such that a correction amount of the filter differential pressure at the time when the second estimated amount at a point in time at which the predetermined condition is satisfied is large is larger than a correction amount of the filter differential pressure at the time when the second estimated amount at the point in time at which the predetermined condition is satisfied is small.

It is presumable that, as the amount of particulate matter that separates from the filter increases, the period required for the once decreased filter differential pressure to recover becomes longer. In the diagnostic system, the electronic control unit may be configured to, when the predetermined condition is satisfied, set the predetermined period such that the predetermined period at the time when the electronic control unit estimates that the amount of the separated particulate matter that separates from the filter as a result of fulfillment of the predetermined condition is large is longer than the predetermined period at the time when the electronic control unit estimates that the amount of the separated particulate matter is small. With this configuration, it is possible to set the period during which the malfunction diagnosis process is not executed to a further appropriate period. It is possible to set the period during which at least one of the determination differential pressure or the filter differential pressure is corrected to a further appropriate period at the time of executing the malfunction diagnosis process.

As described above, it is estimated that the amount of separated particulate matter that separates from the filter as a result of fulfillment of the predetermined condition increases as the temperature of the filter rises. It is estimated that the amount of separated particulate matter that separates from the filter as a result of fulfillment of the predetermined condition increases as the first estimated amount increases. It is estimated that the amount of separated particulate matter that separates from the filter as a result of fulfillment of the predetermined condition increases as the second estimated amount increases. In the diagnostic system, the electronic control unit may be configured to set the predetermined period such that the predetermined period at the time when a temperature of the filter at a point in time at which the predetermined condition is satisfied is high is longer than the predetermined period at the time when the temperature of the filter at the point in time at which the predetermined condition is satisfied is low. In the diagnostic system, the electronic control unit may be configured to set the predetermined period such that the predetermined period at the time when the first estimated amount at a point in time at which the predetermined condition is satisfied is large is longer than the predetermined period at the time when the first estimated amount at the point in time at which the predetermined condition is satisfied is small. In the diagnostic system, the electronic control unit may be configured to calculate a second estimated amount. The second estimated amount may be an estimated amount of urea water-originated deposit accumulated in the filter. The electronic control unit may be configured to set the predetermined period such that the predetermined period at the time when the second estimated amount at a point in time at which the predetermined condition is satisfied is large is longer than the predetermined period at the time when the second estimated amount at the point in time at which the predetermined condition is satisfied is small.

The degree of recovery at the time when the filter differential pressure once decreases because of the separation of particulate matter from the filter and then recovers correlates with the amount of increase in particulate matter accumulation amount in the filter after the particulate matter has separated from the filter. In the diagnostic system, the predetermined period may be a period from a point in time at which the predetermined condition is satisfied to a point in time at which an amount of increase in the first estimated amount reaches a predetermined increasing amount.

It is presumable that, as the amount of particulate matter that separates from the filter increases, a larger amount of particulate matter is required to accumulate again in order for the once decreased filter differential pressure to recover. In the diagnostic system, the electronic control unit may be configured to, when the predetermined condition is satisfied, set the predetermined increasing amount such that the predetermined increasing amount at the time when the electronic control unit estimates that the amount of the separated particulate matter that separates from the filter as a result of fulfillment of the predetermined condition is large is larger than the predetermined increasing amount at the time when the electronic control unit estimates that the amount of the separated particulate matter is small. With this configuration, it is possible to set the period during which the malfunction diagnosis process is not executed to a further appropriate period. It is possible to set the period during which at least one of the determination differential pressure or the filter differential pressure is corrected to a further appropriate period at the time of executing the malfunction diagnosis process.

In the diagnostic system, the electronic control unit may be configured to set the predetermined increasing amount such that the predetermined increasing amount at the time when a temperature of the filter at a point in time at which the predetermined condition is satisfied is high is larger than the predetermined increasing amount at the time when the temperature of the filter at the point in time at which the predetermined condition is satisfied is low. In the diagnostic system, the electronic control unit may be configured to set the predetermined increasing amount such that the predetermined increasing amount at the time when the first estimated amount at a point in time at which the predetermined condition is satisfied is large is larger than the predetermined increasing amount at the time when the first estimated amount at the point in time at which the predetermined condition is satisfied is small. In the diagnostic system, the electronic control unit may be configured to calculate a second estimated amount. The second estimated amount may be an estimated amount of urea water-originated deposit accumulated in the filter. The electronic control unit may be configured to set the predetermined increasing amount such that the predetermined increasing amount at the time when the second estimated amount at a point in time at which the predetermined condition is satisfied is large is larger than the predetermined increasing amount at the time when the second estimated amount at the point in time at which the predetermined condition is satisfied is small.

In the diagnostic system, the electronic control unit may be configured to calculate an estimated particulate matter separation amount that is an estimated amount of the separated particulate matter in a period from when the predetermined condition is satisfied to when the predetermined condition is not satisfied, the predetermined period may be a period obtained by adding an additional period to the period from when the predetermined condition is satisfied to when the predetermined condition is not satisfied, and the electronic control unit may be configured to set the additional period to a longer period as the estimated particulate matter separation amount increases. With this configuration, it is possible to set the predetermined period as a period further corresponding to the amount of separated particulate matter.

With the above configuration, it is possible to reduce erroneous diagnosis at the time of carrying out a diagnosis of a malfunction in a filter on the basis of a filter differential pressure in the configuration that the filter is provided in an exhaust passage of an internal combustion engine in addition to an SCR catalyst at a portion downstream of a urea water addition device.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, example embodiments will be described with reference to the accompanying drawings. The sizes, materials, shapes, relative arrangement, and the like, of components described in the present embodiments do not intend to limit the technical scope unless otherwise specified.

First Embodiment

Figure 1:
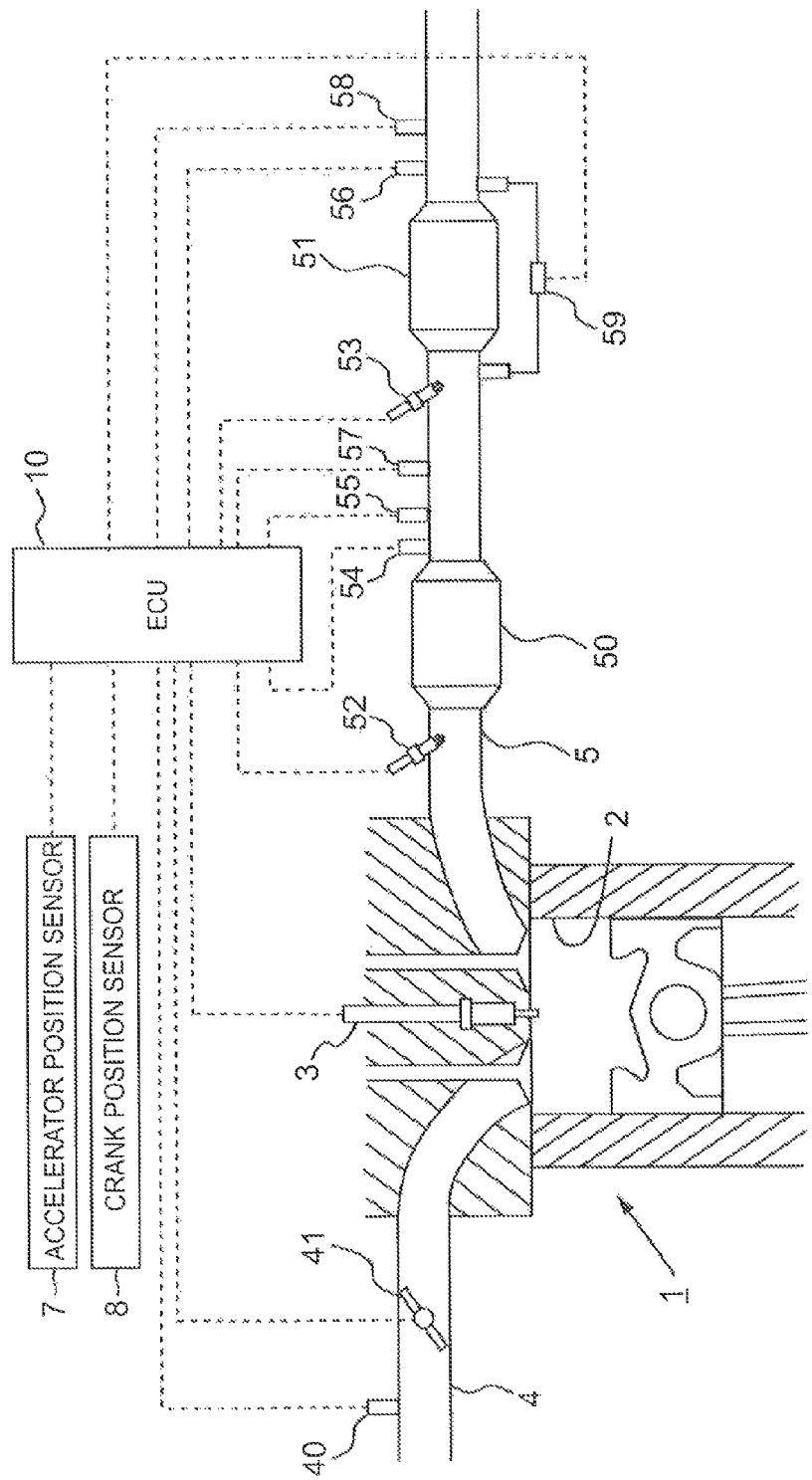
FIG. 1 is a view that shows the schematic configuration of an internal combustion engine and intake and exhaust systems of the internal combustion engine according to embodiments.

FIG. 1 is a view that shows the schematic configuration of an internal combustion engine and intake and exhaust systems of the internal combustion engine according to the present embodiment. The internal combustion engine 1 shown in FIG. 1 is a compression-ignition internal combustion engine (e.g., diesel engine) that uses light oil as fuel. The internal combustion engine 1 may be a spark-ignition internal combustion engine that uses gasoline, or the like, as fuel.

The internal combustion engine 1 includes a fuel injection valve 3 that injects fuel into a cylinder 2. When the internal combustion engine 1 is a spark-ignition internal combustion engine, the fuel injection valve 3 may be configured to inject fuel into an intake port.

The internal combustion engine 1 is connected to an intake passage 4. An air flow meter 40 and an intake throttle valve 41 are provided in the intake passage 4. The air flow meter 40 outputs an electrical signal corresponding to the amount (e.g., mass) of intake air flowing through the intake passage 4. The intake throttle valve 41 is arranged in the intake passage 4 at a portion downstream of the air flow meter 40. The intake throttle valve 41 adjusts the intake air amount of the internal combustion engine 1 by changing the passage sectional area of the intake passage 4.

The internal combustion engine 1 is connected to an exhaust passage 5. An oxidation catalyst 50, an SCRF 51, a fuel addition valve 52 and a urea water addition valve 53 are provided in the exhaust passage 5 as an exhaust as control system. The SCRF 51 is formed such that an SCR catalyst is supported on a wall flow filter made of a porous base material. The thus configured SCRF 51 has a PM collecting function and an NOx purification function. The PM collecting function is used to collect PM in exhaust gas. The NOx purification function is used to reduce NOx in exhaust gas by using ammonia as a reducing agent. The oxidation catalyst 50 is provided in the exhaust passage 5 at a portion upstream of SCRF 51. The fuel addition valve 52 is provided in the exhaust passage 5 at a portion further upstream of the oxidation catalyst 50. The fuel addition valve 52 adds fuel into exhaust gas flowing through the exhaust passage 5. The urea water addition valve 53 is provided in the exhaust passage 5 at a portion downstream of the oxidation catalyst 50 and upstream of the SCRF 51. The urea water addition valve 53 adds urea water into exhaust gas flowing through the exhaust passage 5. When urea water is added from the urea water addition valve 53 into exhaust gas, the urea water is supplied to the SCRF 51. In the SCRF 51, ammonia produced by the hydrolysis of supplied urea adsorbs to the SCR catalyst. NOx in exhaust gas is reduced by using the ammonia adsorbed to the SCR as a reducing agent. That is, the NOx purification function of the SCRF 51 is exercised by supplying urea water from the urea water addition valve 53.

An $O_2$ concentration sensor 54, an upstream temperature sensor 55 and an upstream NOx sensor 57 are provided in the exhaust passage 5 at a portion downstream of the oxidation catalyst 50 and upstream of the urea water addition valve 53. A downstream temperature sensor 56 and a downstream NOx sensor 58 are provided in the exhaust passage 5 at a portion downstream of the SCRF 51. The $O_2$ concentration sensor 54 outputs an electrical signal corresponding to the concentration of $O_2$ in exhaust gas. Each of the upstream temperature sensor 55 and the downstream temperature sensor 56 outputs an electrical signal corresponding to the temperature of exhaust gas. Each of the upstream NOx sensor 57 and the downstream NOx sensor 58 outputs an electrical signal corresponding to the concentration of NOx in exhaust gas. A differential pressure sensor 59 is provided in the exhaust passage 5. The differential pressure sensor 59 outputs an electrical signal corresponding to a filter differential pressure that is a pressure difference in exhaust gas between the upstream side and downstream side of the SCRF 51.

An electronic control unit (ECU) 10 is provided in combination with the internal combustion engine 1. The ECU 10 is a unit that controls the operation state, and the like, of the internal combustion engine 1. Various sensors, such as an accelerator position sensor 7 and a crank position sensor 8, are electrically connected to the ECU 10 in addition to the air flow meter 40, the $O_2$ concentration sensor 54, the upstream temperature sensor 55, the upstream NOx sensor 57, the downstream temperature sensor 56, the downstream NOx sensor 58 and the differential pressure sensor 59. The accelerator position sensor 7 is a sensor that outputs an electrical signal that correlates with the operation amount of an accelerator pedal (not shown) (accelerator operation amount). The crank position sensor 8 is a sensor that outputs an electrical signal that correlates with the rotation position of an engine output shaft (e.g., crankshaft) of the internal combustion engine 1. The output signals of these sensors are input to the ECU 10.

Various devices, such as the fuel injection valve 3, the intake throttle valve 41, the fuel addition valve 52 and the urea water addition valve 53, are electrically connected to the ECU 10. The ECU 10 controls the various devices on the basis of the output signals of the above-described sensors. For example, the ECU 10 controls a urea water addition amount from the urea water addition valve 53 in order to keep an ammonia adsorption amount in the SCRF 51 (that is, the amount of ammonia adsorbed to the SCR catalyst) at a target adsorption amount. The target adsorption amount is a value determined in advance on the basis of an experiment, or the like, as a value at which it is possible to ensure a desired NOx purification ratio (e.g., the ratio of the amount of NOx that is reduced in the SCRF 51 to the amount of NOx that flows into the SCRF 51) in the SCRF 51 and it is possible to suppress the amount of ammonia that flows out from the SCRF 51 within an allowable range.

The ECU 10 executes a filter regeneration process by adding fuel from the fuel addition valve 52 when an estimated amount of PM accumulated in the SCRF 51 has reached a predetermined threshold. In the filter regeneration process, the temperature of the SCRF 51 is raised by heat of oxidation that is generated when fuel added from the fuel addition valve 52 is oxidized in the oxidation catalyst 50. At this time, the ECU 10 controls a fuel addition amount from the fuel addition valve 52 in order to set the temperature of the SCRF 51 to a target temperature. The temperature of the SCRF 51 is estimated on the basis of the output value of the downstream temperature sensor 56. The target temperature is a value determined in advance on the basis of an experiment, or the like, as a temperature at which oxidation of PM is possible. As a result, PM that has accumulated in the SCRF 51 is burned and removed.

In the present embodiment, the SCRF in which the SCR catalyst is supported on the filter is employed; however, the configuration of the filter and SCR catalyst is not limited to this configuration. That is, the filter and the SCR catalyst may be separately arranged in the exhaust passage at a portion downstream of the urea water addition valve. In this case, the filter and the SCR catalyst may be arranged in order from the upstream side or may be arranged in the reverse order. In the present embodiment, the differential pressure sensor is employed as means for acquiring the filter differential pressure; however, the configuration of a differential pressure acquisition device is not limited to this configuration. For example, pressure sensors may be respectively provided in the exhaust passage at a portion upstream of the filter and a portion downstream of the filter, and a filter differential pressure may be calculated from a difference between the output values of these two pressure sensors.

Diagnosis of Malfunction in SCRF

There is a case where a malfunction, such as breakage and melting damage, may occur in the SCRF 51 because of, for example, a rise in temperature resulting from execution of the filter regeneration process. If such a malfunction occurs, the PM collecting function of the SCRF 51 decreases, resulting in an increase in the amount of PM that is released to the atmosphere. In the present embodiment, whether there is a malfunction in the SCRF 51 is diagnosed (that is, whether the PM collecting function of the SCRF 51 is in an abnormal state is diagnosed) by using the output value of the differential pressure sensor 59. Hereinafter, a method of diagnosing a malfunction in the SCRF according to the present embodiment will be described.

Figure 2:
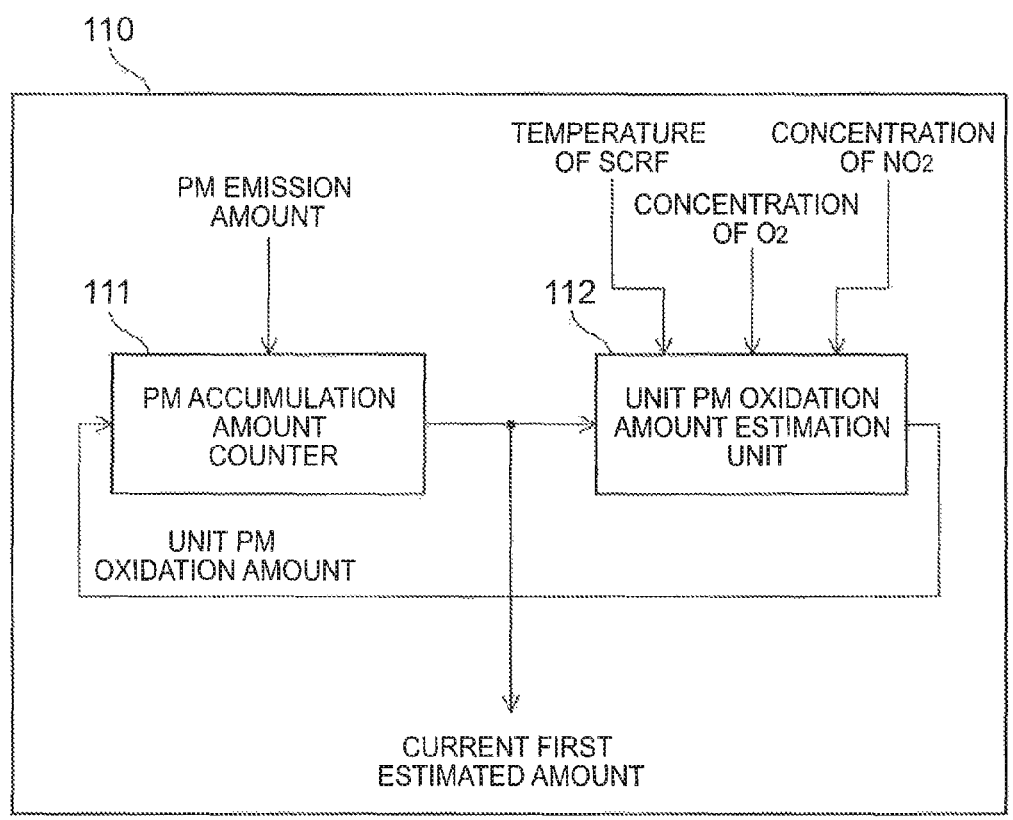
FIG. 2 is a block diagram that shows the functions of a PM accumulation amount estimation unit in an ECU according to the embodiments.

In the present embodiment, the ECU 10 continuously estimates a first estimated amount that is an estimated amount of PM accumulated in the SCRF 51. FIG. 2 is a block diagram that shows the functions of a PM accumulation amount estimation unit 110 in the ECU 10. The PM accumulation amount estimation unit 110 is a functional unit for estimating the first estimated amount. The PM accumulation amount estimation unit 110 according to the present embodiment estimates a PM accumulation amount on the assumption that the SCRF 51 is in a normal state.

The PM accumulation amount estimation unit 110 includes a PM accumulation amount counter 111 and a unit PM oxidation amount estimation unit 112. The amount of PM emitted from the internal combustion engine 1 per unit time (hereinafter, which may also be referred to as "unit PM emission amount") is input to the PM accumulation amount counter 111. The unit PM emission amount may be estimated on the basis of the operation state of the internal combustion engine 1. The PM accumulation amount counter 111 calculates a PM correction amount per unit time in the SCRF 51 (hereinafter, which may also be referred to as "unit PM collection amount") by multiplying the input unit PM emission amount by a predetermined PM correction ratio (e.g., the ratio of the amount of PM collected by the SCRF 51 to the amount of PM that flows into the SCRF 51). The predetermined PM correction ratio may be determined on the basis of the flow rate of exhaust gas. The calculated unit PM collection amount is integrated.

In addition to the first estimated amount that is the current estimated PM accumulation amount in the SCRF 51, calculated by the PM accumulation amount counter 111, the temperature of the SCRF 51, the concentration of $O_2$ in exhaust gas flowing into the SCRF 51 (hereinafter, which may also be referred to as "inflow exhaust gas") and the concentration of $NO_2$ in inflow exhaust gas are input to the unit PM oxidation amount estimation unit 112. The temperature of the SCRF 51 may be estimated on the basis of the output value of the downstream temperature sensor 56. The concentration of $O_2$ in inflow exhaust gas is detected by the $O_2$ concentration sensor 54. The concentration of $O_2$ in inflow exhaust gas may be estimated on the basis of the air-fuel ratio of exhaust gas, the operation state of the internal combustion engine 1, or the like. The concentration of $NO_2$ in inflow exhaust gas may be estimated on the basis of the output value of the air flow meter 40, the output value of the upstream temperature sensor 55, the output value of the upstream NOx sensor 57, and the like. The amount of NOx in exhaust gas may be estimated on the basis of the flow rate of exhaust gas and the output value of the upstream NOx sensor 57. The flow rate of exhaust gas is estimated on the basis of the output value of the air flow meter 40. The ratio of $NO_2$ in inflow exhaust gas may be estimated on the basis of the temperature of the oxidation catalyst 50 and the flow rate of exhaust gas. The temperature of the oxidation catalyst 50 is estimated on the basis of the output value of the upstream temperature sensor 55. The concentration of $NO_2$ in inflow exhaust gas may be estimated on the basis of the amount of NOx in exhaust gas, the estimated ratio of $NO_2$ in the amount of NOx in inflow exhaust gas, and the like.

The unit PM oxidation amount estimation unit 112 calculates a PM oxidation amount in the SCRF 51 per unit time (hereinafter, which may also be referred to as "unit PM oxidation amount") on the basis of the input current first estimated amount, the input temperature of the SCRF 51, the input concentration of $O_2$ in inflow exhaust gas and the input concentration of $NO_2$ in inflow exhaust gas. The calculated unit PM oxidation amount is input to the PM accumulation amount counter 111. The PM accumulation amount counter 111 calculates the current first estimated amount by subtracting the unit PM oxidation amount from the integrated PM collection amount calculated as described above.

At the time of diagnosing a malfunction in the SCRF, a determination differential pressure is set on the basis of the first estimated amount calculated by the PM accumulation amount estimation unit 110 as described above. The ECU 10 executes a malfunction diagnosis process for diagnosing whether there is a malfunction in the SCRF 51 by comparing an actual filter differential pressure, which is detected by the differential pressure sensor 59, with the determination differential pressure. If there occurs a malfunction in the SCRF 51, the filter differential pressure decreases as compared to when the SCRF 51 is in the normal state. Therefore, in the malfunction diagnosis process, when the actual filter differential pressure, which is detected by the differential pressure sensor 59, is smaller than the determination differential pressure, it is diagnosed that there is a malfunction in the SCRF 51. That is, the determination differential pressure is set as a lower limit value of the filter differential pressure in the case where the SCRF 51 is in the normal state.

In the present embodiment, the PM accumulation amount estimation unit 110 is an example of a PM accumulation amount estimation unit. The method of estimating a first estimated amount by the PM accumulation amount estimation unit is not limited to the above-described method. Any known method may be employed as the method of estimating a first estimated amount as long as the estimation method uses a parameter other than the filter differential pressure.

Behaviors of Urea Deposit and PM

In the present embodiment, urea water added from the urea water addition valve 53 is supplied to the SCRF 51. Therefore, other than PM emitted from the internal combustion engine 1, a urea deposit may accumulate in the SCRF 51. A urea deposit that has once accumulated in the SCRF 51 vaporizes or becomes ammonia gas into gaseous form to separate from the SCRF 51. The temperature at which a urea deposit vaporizes or the temperature at which a urea deposit becomes ammonia gas is lower than the oxidation temperature of PM. That is, even when the temperature of the SCRF 51 is lower than the oxidation temperature of PM, a urea deposit separates from the SCRF 51.

Figure 3:
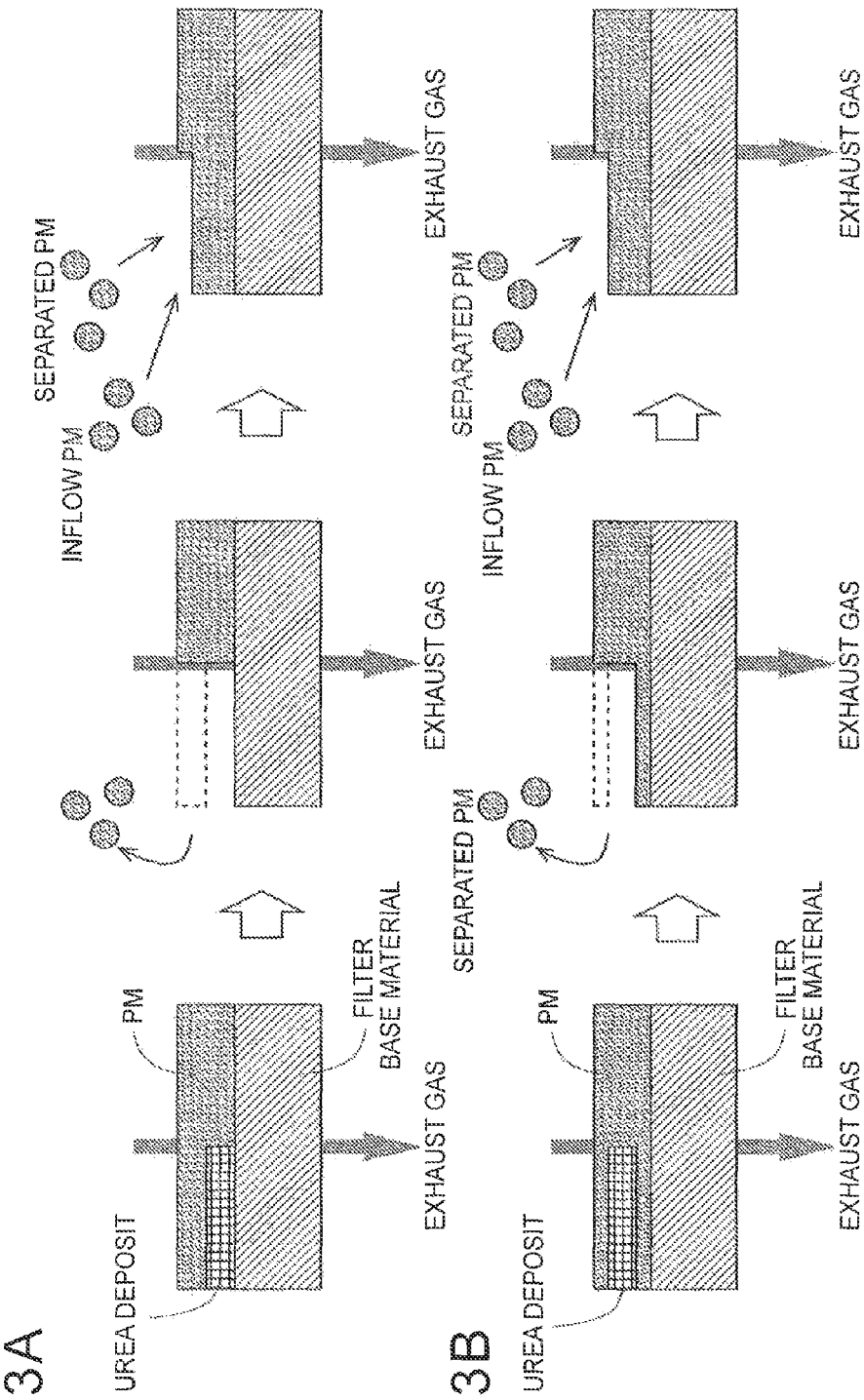
FIG. 3A and FIG. 3B are conceptual views that show the behavior of PM at the time when a urea deposit separates from an SCRF according to the embodiments.

FIG. 3A and FIG. 3B are a conceptual view that shows the behavior of PM at the time when a urea deposit separates from the SCRF 51. As shown in FIG. 3A and FIG. 3B, a urea deposit and PM may accumulate on the base material of the SCRF 51 so as to overlap with each other. In such a case, when the urea deposit separates from the SCRF 51, the PM accumulated on the urea deposit so as to overlap with the urea deposit may also separate from the SCRF 51 accordingly without being oxidized. At this time, PM that has separated from the SCRF 51 (e.g., separated PM) is collected again by the SCRF 51. PM newly flowing into the SCRF 51 (e.g., inflow PM) is continuously collected by the SCRF 51. Therefore, PM accumulates again on the portion in the SCRF 51, from which the urea deposit and the PM have separated.

Figure 4:
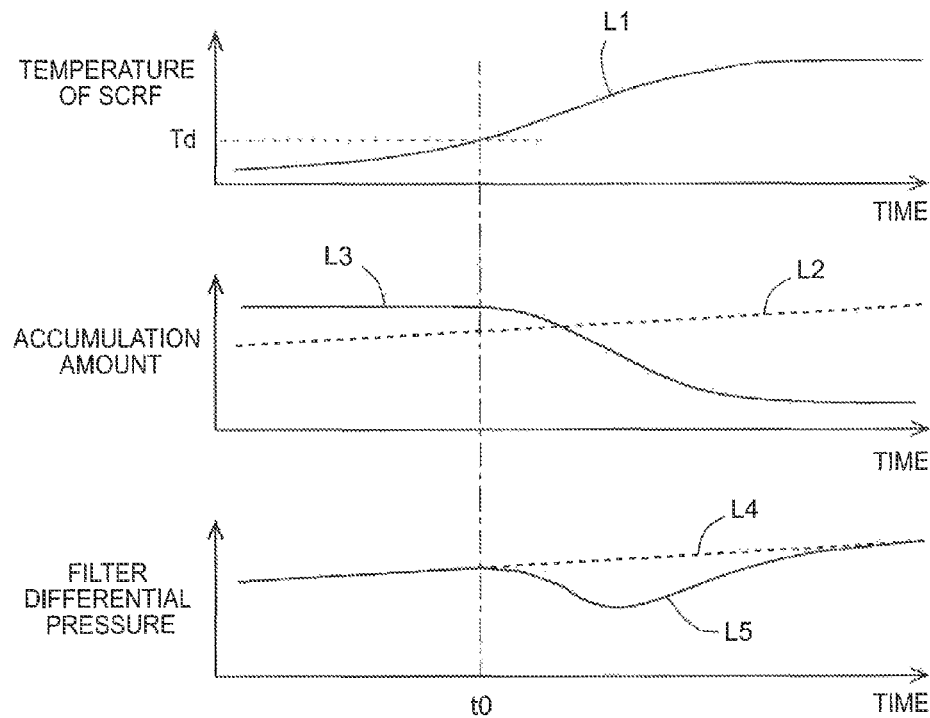
FIG. 4 is a time chart that shows changes in the temperature of the SCRF, changes in the amount of PM accumulated in the SCRF and the amount of urea deposit accumulated in the SCRF, and changes in filter differential pressure according to the embodiments.

FIG. 4 is a time chart that shows changes in the temperature of the SCRF 51, changes in the amount of PM accumulated in the SCRF 51 and the amount of urea deposit accumulated in the SCRF 51, and changes in filter differential pressure. In FIG. 4, the line L1 indicates changes in the temperature of the SCRF 51. The line L2 indicates changes in first estimated amount that is estimated by the PM accumulation amount estimation unit 110 of the ECU 10. The line L3 indicates changes in the amount of urea deposit accumulated in the SCRF 51. The line L4 indicates changes in filter differential pressure corresponding to the first estimated amount. The line L5 indicates changes in actual filter differential pressure that is detected by the differential pressure sensor 59.

In FIG. 4, as indicated by the line L1, the temperature of the SCRF 51 gradually rises with a lapse of time, and the temperature of the SCRF 51 becomes higher than or equal to a temperature Td at which the separation of a urea deposit occurs at time t0. Therefore, as indicated by the line L3, the amount of urea deposit accumulated in the SCRF 51 begins to decrease from time t0. At this time, as indicated by the line L2, the first estimated amount continues to increase after time t0. However, after time t0, when PM separates from the SCRF 51 with the separation of a urea deposit as shown in FIG. 4, an actual PM accumulation amount in the SCRF 51 reduces. With a reduction of the PM accumulation amount in the SCRF 51, the actual filter differential pressure decreases from time t0 as indicated by the line L5. However, as described above, PM accumulates again on the portion of the SCRF 51, from which the urea deposit and the PM have separated, so the actual filter differential pressure once decreases and then increases as indicated by the line L5 in FIG. 4. After a lapse of a certain time from time t0, the actual filter differential pressure recovers to a value corresponding to the first estimated amount.

Setting of Diagnosis Prohibition Period

As described above, in diagnosis of a malfunction in the SCRF 51 according to the present embodiment, it is diagnosed whether there is a malfunction in the SCRF 51 by comparing the actual filter differential pressure, which is detected by the differential pressure sensor 59, with the determination differential pressure. Therefore, as indicated by the line L5 from time t0 in FIG. 4, if the malfunction diagnosis process for the SCRF is executed while the filter differential pressure has been significantly decreasing because of the separation of the PM from the SCRF 51 with the separation of the urea deposit, there is a concern that it is erroneously diagnosed that there is a malfunction in the SCRF 51 although the SCRF 51 is actually in the normal state.

In the present embodiment, the ECU 10 determines whether a predetermined condition is satisfied. The predetermined condition is set as a condition under which the amount of separated PM that separates from the SCRF 51 with the separation of a urea deposit can be larger than or equal to a predetermined separation amount. The predetermined separation amount is a threshold of the amount of separated PM at or above which it may be determined that the amount of decrease in filter differential pressure due to the separation of PM becomes larger than an allowable amount.

When the ECU 10 determines that the predetermined condition is satisfied, a predetermined diagnosis prohibition period is provided. During the predetermined diagnosis prohibition period, execution of the malfunction diagnosis process for the SCRF is prohibited. The diagnosis prohibition period is set so as to be longer than or equal to a period that is estimated to be minimally required from the beginning of a decrease in the filter differential pressure due to the separation of PM from the SCRF 51 to the recovery of the filter differential pressure as described above. Because such a diagnosis prohibition period is set, it is possible to avoid execution of the malfunction diagnosis process for the SCRF 51 in the state where there is a high possibility of occurrence of an erroneous diagnosis. Therefore, it is possible to reduce erroneous diagnosis in diagnosing a malfunction in the SCRF 51.

The amount of separated PM at the time when PM separates from the SCRF 51 with the separation of a urea deposit correlates with the PM accumulation amount in the SCRF 51 and the temperature of the SCRF 51. Specifically, as the PM accumulation amount in the SCRF 51 increases, the PM accumulation amount, by which PM accumulates so as to overlap with a urea deposit as indicated by FIG. 3A and FIG. 3B, also increases. Therefore, as the PM accumulation amount in the SCRF 51 increases, the amount of separated PM that separates from the SCRF 51 with the separation of a urea deposit increases. As the temperature of the SCRF 51 rises, the separation of a urea deposit is facilitated. Therefore, as the temperature of the SCRF 51 rises, the amount of separated PM that separates from the SCRF 51 with the separation of a urea deposit increases.

Figure 5:
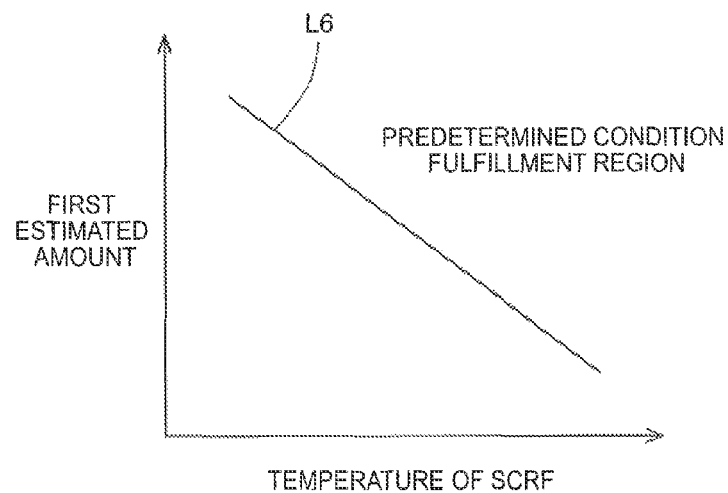
FIG. 5 is a map that shows the correlation between both the temperature of the SCRF and a first estimated amount and a region in which a predetermined condition is satisfied according to a first embodiment.

In the present embodiment, the predetermined condition is defined on the basis of the first estimated amount and the temperature of the SCRF 51. That is, in the present embodiment, the predetermined condition is defined as a condition that the temperature of the SCRF 51 is higher than or equal to a predetermined temperature and the first estimated amount is larger than or equal to a first predetermined amount. The predetermined temperature and the first predetermined amount at this time are determined by the map shown in FIG. 5. In FIG. 5, the abscissa axis represents the temperature of the SCRF 51, and the ordinate axis represents the first estimated amount. The line L6 indicates the boundary of a region in which the predetermined condition is satisfied. As shown in FIG. 5, as the first estimated amount increases, the predetermined condition is satisfied even when the temperature of the SCRF 51 is a lower temperature. As the temperature of the SCRF 51 rises, the predetermined condition is satisfied even when the first estimated amount is a smaller value. That is, the line L6 in FIG. 5 indicates the correlation between the first estimated amount and the predetermined temperature, and the predetermined temperature is set to a lower temperature as the first estimated amount increases. The line L6 in FIG. 5 indicates the correlation between the temperature of the SCRF 51 and the first predetermined amount, and the first predetermined amount is set to a smaller value as the temperature of the SCRF 51 rises.

It is presumable that, as the amount of separated PM that separates from the SCRF 51 with the separation of a urea deposit increases, the period required for the once decreased filter differential pressure to recover becomes longer. Therefore, when it is estimated that the amount of PM that separates from the SCRF 51 as a result of fulfillment of the above-described predetermined condition is large, the diagnosis prohibition period is set to a longer period as compared to when it is estimated that the amount of separated PM is small.

Figure 6:
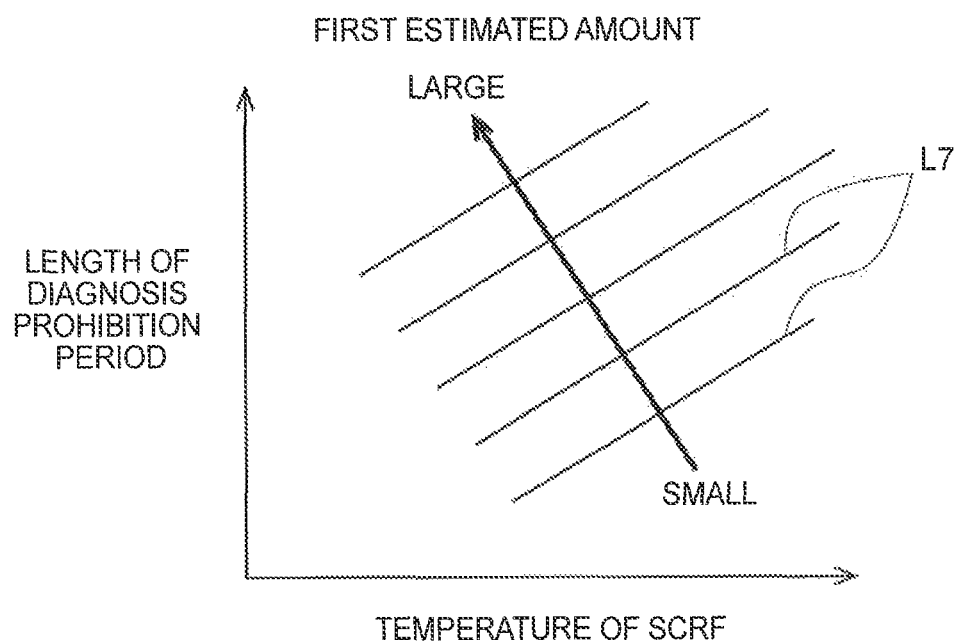
FIG. 6 is a map that shows the correlation between both the temperature of the SCRF and the first estimated amount at the point in time, at which the ECU determines that the predetermined condition is satisfied, and the length of a diagnosis prohibition period.

Specifically, in the present embodiment, the length of the diagnosis prohibition period is set on the basis of the temperature of the SCRF 51 and the first estimated amount at the point in time at which the 10 determines that the predetermined condition is satisfied. FIG. 6 is a map that shows the correlation between both the temperature of the SCRF 51 and the first estimated amount at the point in time, at which the ECU 10 determines that the predetermined condition is satisfied, and the length of the diagnosis prohibition period. In FIG. 6, each line L7 indicates the correlation between the temperature of the SCRF 51 at the point in time, at which it is determined that the predetermined condition is satisfied, and the length of the diagnosis prohibition period. In the map shown in FIG. 6, the correlation between the temperature of the SCRF 51 and the length of the diagnosis prohibition period is set in response to the first estimated amount at the point in time at which it is determined that the predetermined condition is satisfied, is set. As the temperature of the SCRF 51 at the point in time, at which the ECU 10 determines that the predetermined condition is satisfied, rises, the amount of separated PM increases. As the first estimated amount at the point in time, at which the ECU 10 determines that the predetermined condition is satisfied, increases, the amount of separated PM increases. Therefore, as shown in FIG. 6, as the temperature of the SCRF 51 rises or as the first estimated amount increases, the diagnosis prohibition period is set to a longer period.

Flow of Setting Diagnosis Prohibition Period

Figure 7:
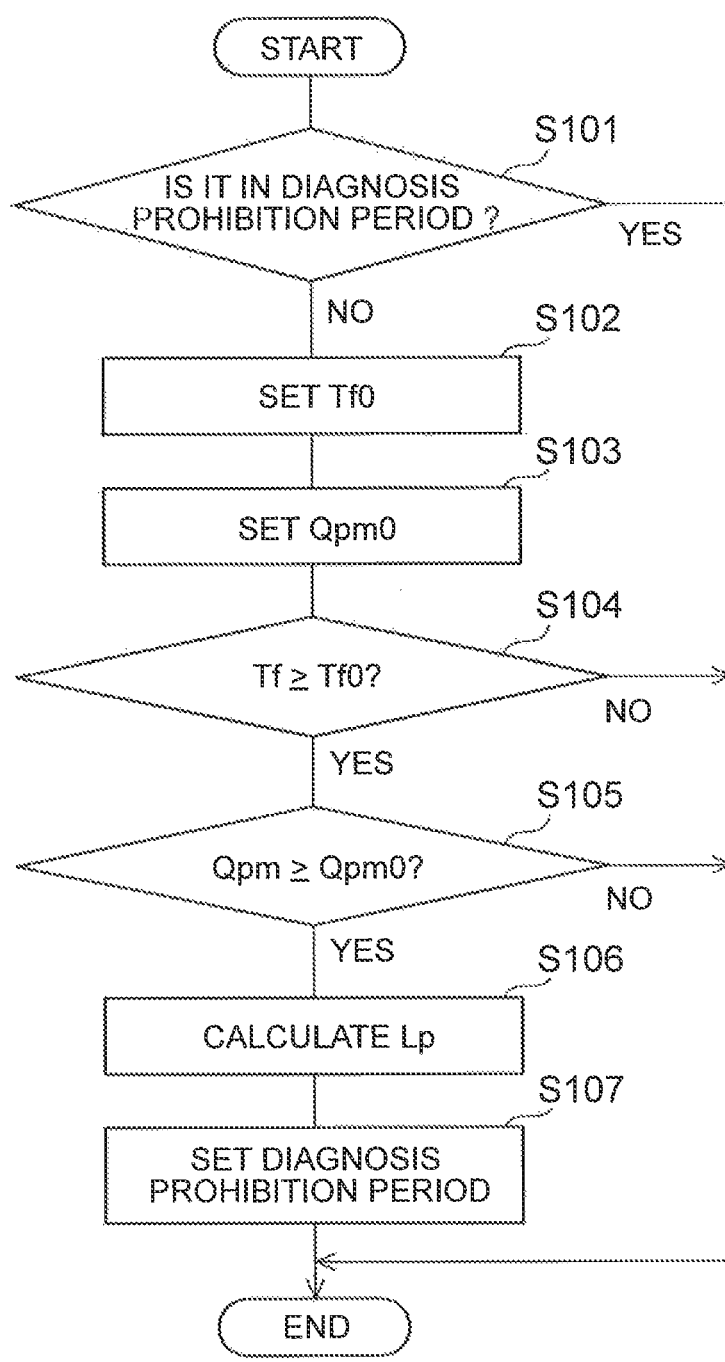
FIG. 7 is a flowchart that shows the flow of setting the diagnosis prohibition period according to the first embodiment.

Hereinafter, the flow for setting the diagnosis prohibition period according to the present embodiment will be described with reference to FIG. 7. FIG. 7 is a flowchart that shows the flow of setting the diagnosis prohibition period according to the present embodiment. The flow is stored in the ECU 10 in advance, and is repeatedly executed by the ECU 10 at predetermined intervals during operation of the internal combustion engine 1.

In this flow, initially, in S101, it is determined whether it is currently in the diagnosis prohibition period. When affirmative determination is made in S101, execution of the flow is once ended. On the other hand, when negative determination is made in S101, a predetermined temperature Tf0 is subsequently set in S102 on the basis of a current first estimated amount Qpm that is calculated by the PM accumulation amount estimation unit 110. Subsequently, in S103, a first predetermined amount Qpm0 is set on the basis of the current temperature Tf of the SCRF 51, which is estimated on the basis of the output value of the downstream temperature sensor 56. In S102 and S103, the predetermined temperature Tf0 and the first predetermined amount Qpm0 are set by using the map shown in FIG. 5.

Subsequently, in S104, it is determined whether the current temperature Tf of the SCRF 51 is higher than or equal to the predetermined temperature Tf0 set in S102. When negative determination is made in S104, execution of the flow is once ended. On the other hand, when affirmative determination is made in S104, it is subsequently determined in S105 whether the current first estimated amount Qpm is larger than or equal to the first predetermined amount Qpm0 set in S103. When negative determination is made in S105, execution of the flow is once ended.

On the other hand, when affirmative determination is made in S105, it may be determined that the predetermined condition according to the present embodiment is satisfied. In this case, subsequently, in S106, the length Lp of the diagnosis prohibition period is calculated on the basis of the current temperature Tf of the SCRF 51 and the current first estimated amount Qpm. In S106, the length Lp of the diagnosis prohibition period is calculated by using the map shown in FIG. 6. Subsequently, in S107, the period of the length Lp calculated in S106 from the current time, that is, the point in time at which it is determined that the predetermined condition is satisfied, is set as the diagnosis prohibition period.

Flow of Diagnosing Malfunction in SCRF

Figure 8:
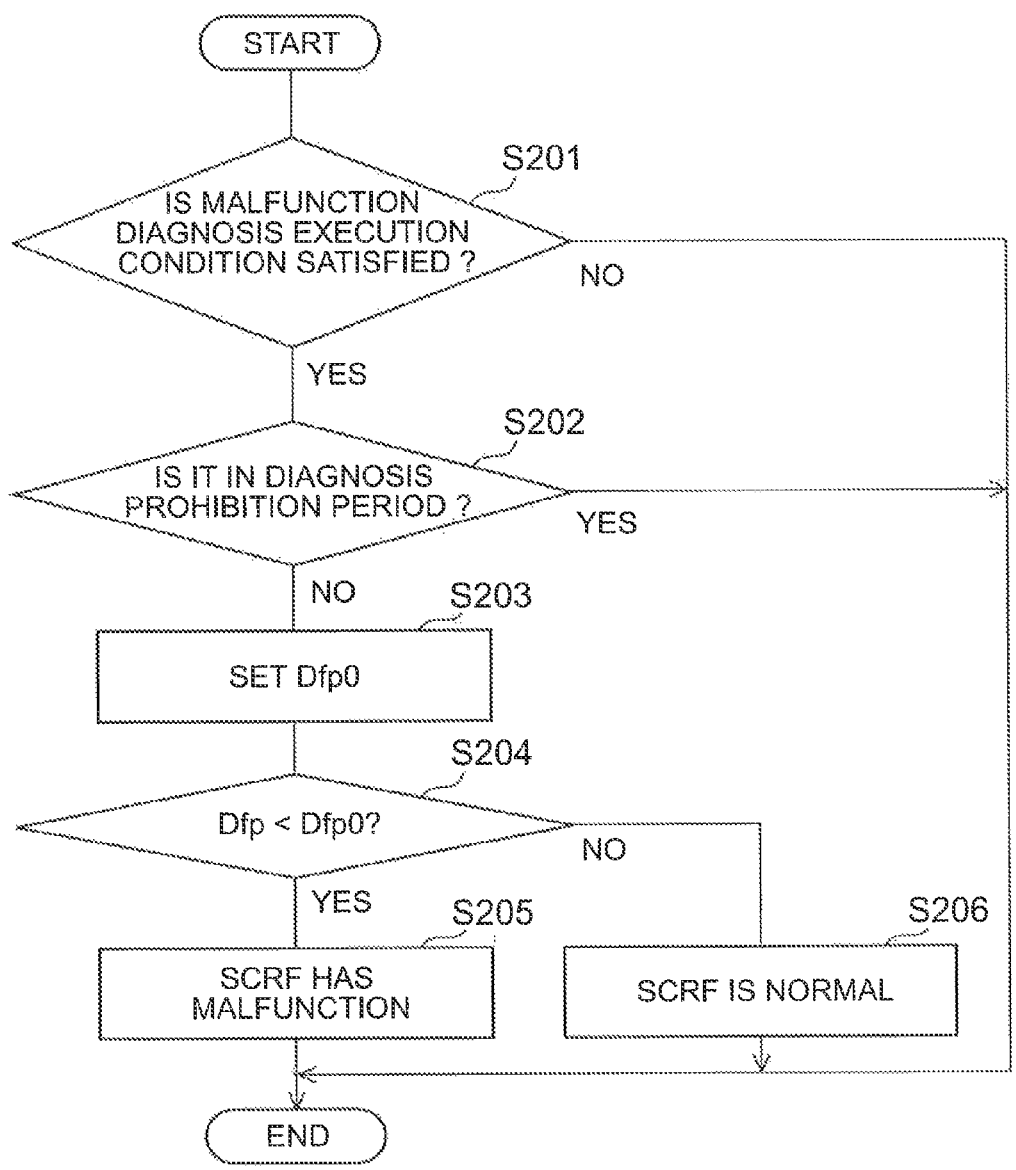
FIG. 8 is a flowchart that shows the flow of diagnosing whether there is a malfunction in the SCRF according to the first embodiment.

Next, the flow of diagnosing a malfunction in the SCRF 51 according to the present embodiment will be described with reference to FIG. 8. FIG. 8 is a flowchart that shows the flow of diagnosing a malfunction in the SCRF 51 according to the present embodiment. The flow is stored in the ECU 10 in advance, and is repeatedly executed by the ECU 10 at predetermined it during operation of the internal combustion engine 1.

In this flow, initially, in S201, it is determined whether a predetermined malfunction diagnosis execution condition is satisfied. The malfunction diagnosis execution condition may include, for example, a condition that the operation state of the internal combustion engine 1 is steady operation and a predetermined period has elapsed from execution of the last malfunction diagnosis process, a condition that a predetermined period has elapsed from the start of the current operation of the internal combustion engine 1, and the like. The malfunction diagnosis execution condition is set such that the necessary and sufficient frequency of execution of the malfunction diagnosis process is ensured. When negative determination is made in S201, execution of the flow is once ended.

When affirmative determination is made in S201, it is subsequently determined in S202 whether it is currently in the diagnosis prohibition period set by the flow shown in FIG. 7. When negative determination is made in S202, a determination differential pressure Dfp0 is subsequently set in S203 on the basis of the current first estimated amount Qpm that is calculated by the PM accumulation amount estimation unit 110. The correlation between the first estimated amount Qpm and the determination differential pressure Dfp0 is determined in advance on the basis of an experiment, or the like, and the correlation therebetween is stored in the ECU 10 as a map. In this map, as the first estimated amount Qpm increases, the determination differential pressure Dfp0 becomes a larger value. In S203, the determination differential pressure Dfp0 is set by using the map.

Subsequently, the malfunction diagnosis process is executed in S204. That is, in S204, it is determined whether an actual filter differential pressure Dfp that is detected by the differential pressure sensor 59 is smaller than the determination differential pressure Dfp0 set in S203. When affirmative determination is made in S204, it is subsequently determined in S205 that there is a malfunction in the SCRF 51. On the other band, when negative determination is made in S204, it is subsequently determined in S206 that the SCRF 51 is in the normal state.

On the other hand, when affirmative determination is made in S202, that is, when it is currently in the diagnosis prohibition period, execution of the flow is once ended. That is, in this case, the malfunction diagnosis process is not executed. In this case, after that, when the malfunction diagnosis execution condition is satisfied at the time when the diagnosis prohibition period ends, the malfunction diagnosis process is executed.

In the flow shown in FIG. 8, whether the malfunction diagnosis execution condition is satisfied and whether it is in the diagnosis prohibition period are respectively determined in separate steps. However, the malfunction diagnosis execution condition may include a condition that it is not in the diagnosis prohibition period.

In the present embodiment, as for the predetermined temperature and the first predetermined amount that define the predetermined condition, as shown in FIG. 5, the predetermined temperature is continuously changed in response to the first estimated amount, and the first predetermined amount is continuously changed in response to the temperature of the SCRF 51. However, the predetermined temperature may be changed for the first estimated amount in a stepwise manner. The first predetermined amount may be changed for the temperature of the SCRF 51 in a stepwise manner. One of the predetermined temperature and the first predetermined amount may be set to a predetermined constant value. However, as described above, it is possible to define the predetermined condition as a further appropriate condition by setting the predetermined temperature to a value commensurate with the first estimated amount and setting the first predetermined amount to a value commensurate with the temperature of the SCRF 51. That is, it is possible to reduce an unnecessary diagnosis prohibition period.

In the present embodiment, the length of the diagnosis prohibition period is set on the basis of the temperature of the SCRF 51 and the first estimated amount at the point in time at which the ECU 10 determines that the predetermined condition is satisfied. However, the length of the diagnosis prohibition period may be set to a predetermined constant length. However, as described above, it is possible to set the diagnosis prohibition period to an appropriate period by setting the length of the diagnosis prohibition period on the basis of the temperature of the SCRF 51 and the first estimated amount. The length of the diagnosis prohibition period may be set on the basis of one of the temperature of the SCRF 51 and the first estimated amount at the point in time at which the ECU 10 determines that the predetermined condition is satisfied. The length of the diagnosis prohibition period may be changed in a stepwise manner for the temperature of the SCRF 51 or the first estimated amount at the point in time at which the ECU 10 determines that the predetermined condition is satisfied.

Alternative Embodiment

As described above, the filter differential pressure that has decreased because of the separation of PM from the SCRF 51 recovers when PM accumulates again in the SCRF 51. Therefore, the degree of recovery at the time when the filter differential pressure once decreases because of the separation of PM from the SCRF 51 and then recovers correlates with the amount of increase in PM accumulation amount in the SCRF 51 after PM has separated from the SCRF 51. In an alternative embodiment to the present embodiment, the diagnosis prohibition period is set as a period that is taken until the amount of increase in first estimated amount from the point in time, at which the ECU 10 determines that the predetermined condition is satisfied, reaches a predetermined increasing amount.

Figure 9:
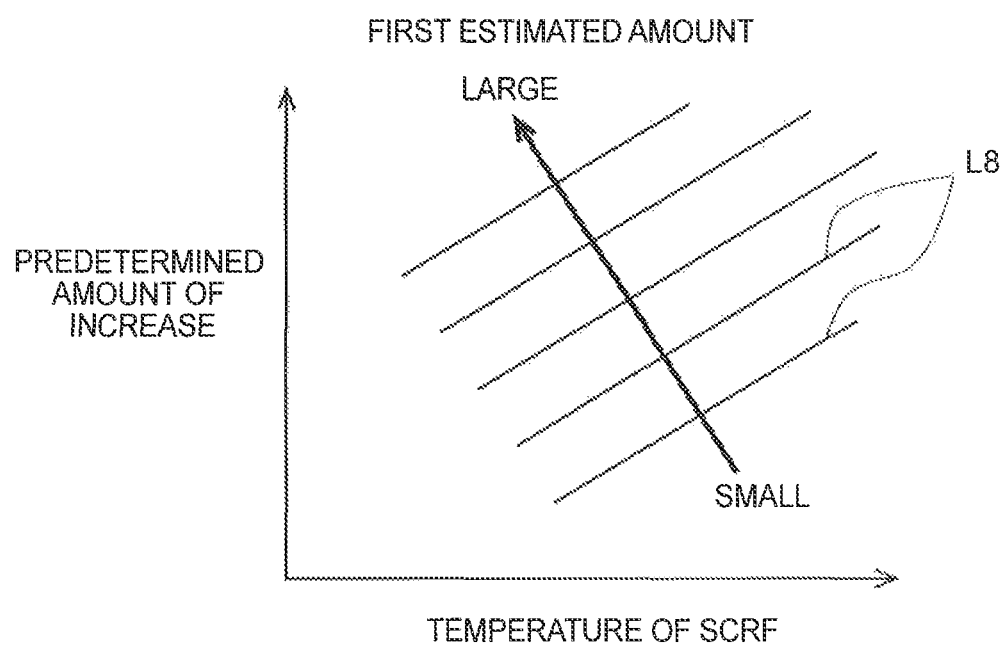
FIG. 9 is a map that shows the correlation between both the temperature of the SCRF and the first estimated amount at the point in time, at which the ECU determines that the predetermined condition is satisfied, and a predetermined increasing amount according to an alternative embodiment to the first embodiment.

FIG. 9 is a map that shows the correlation between both the temperature of the SCRF 51 and the first estimated amount at the point in time, at which the ECU 10 determines that the predetermined condition is satisfied, and the predetermined increasing amount. In FIG. 9, each line L8 indicates the correlation between the temperature of the SCRF 51 at the point in time, at which it is determined that the predetermined condition is satisfied, and the predetermined increasing amount. In the map shown in FIG. 9, the correlation between the temperature of the SCRF 51 and the predetermined increasing amount, corresponding to the first estimated amount at the point in time at which it is determined that the predetermined condition is satisfied, is set. As shown in FIG. 9, as the temperature of the SCRF 51 at the point in time, at which it is determined that the predetermined condition is satisfied, rises or as the first estimated amount at this point in time increases, the predetermined increasing amount is set to a larger value.

It is presumable that, as the PM separation amount from the SCRF 51 increases, a larger amount of PM is required to accumulate again in order for the once decreased filter differential pressure to recover. According to the above, when the ECU 10 determines that the predetermined condition is satisfied and when it is estimated that the amount of separated PM that separates from the SCRF 51 as a result of fulfillment of the predetermined condition is large, the predetermined increasing amount is set to a larger value as compared to when it is estimated that the amount of separated PM is small. Therefore, according to the present alternative embodiment, it is possible to set the diagnosis prohibition period to a further appropriate period.

When the flow of setting the diagnosis prohibition period as shown in FIG. 7 is applied to the present alternative embodiment, the predetermined increasing amount is calculated in S106 on the basis of the current temperature Tf of the SCRF 51 and the current first estimated amount. At this time, the predetermined increasing amount is calculated by using the map shown in FIG. 9. In S107, the period during which the amount of increase in first estimated amount from the current point in time, that is, the point in time at which it is determined that the predetermined condition is satisfied, reaches the predetermined increasing amount calculated in S106 is set as the diagnosis prohibition period.

In the present alternative embodiment, the predetermined increasing amount may be set to a predetermined constant amount. However, as described above, it is possible to set the diagnosis prohibition period to a further appropriate period by setting the predetermined increasing amount on the basis of the temperature of the SCRF 51 and the first estimated amount. The predetermined increasing amount may be set on the basis of one of the temperature of the SCRF 51 and the first estimated amount at the point in time at which the ECU 10 determines that the predetermined condition is satisfied. The predetermined increasing amount may be changed in a stepwise manner for the temperature of the SCRF 51 or the first estimated amount at the point in time at which the ECU 10 determines that the predetermined condition is satisfied.

Second Embodiment

In the present embodiment, as in the case of the first embodiment, the PM accumulation amount estimation unit 110 in the ECU 10 continuously estimates the first estimated amount. In addition, in the present embodiment, the ECU 10 continuously estimates a second estimated amount that is an estimated amount of urea deposit accumulated in the SCRF 51.

Figure 10:
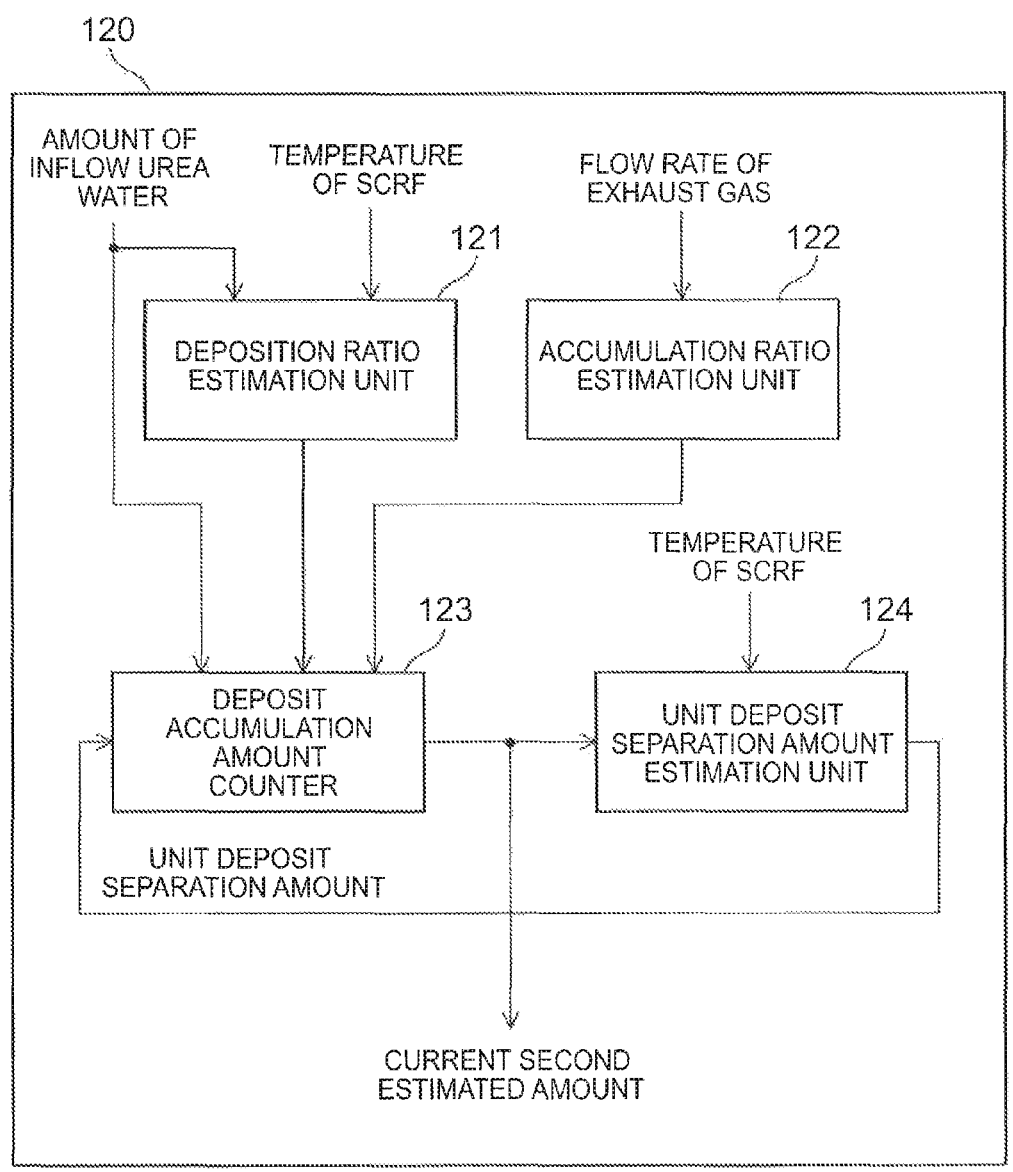
FIG. 10 is a block diagram that shows the functions of a deposit accumulation amount estimation unit in an ECU according to a second embodiment.

FIG. 10 is a block diagram that shows the functions of a deposit accumulation amount estimation unit 120 in the ECU 10. The deposit accumulation amount estimation unit 120 is a functional unit for estimating the second estimated amount. The deposit accumulation amount estimation unit 120 includes a deposition ratio estimation unit 121, an accumulation ratio estimation unit 122, a deposit accumulation amount counter 123 and a unit deposit separation amount estimation unit 124.

The amount of urea water flowing into the SCRF 51 and the temperature of the SCRF 51 are input to the deposition ratio estimation unit 121. With the configuration according to the present embodiment, the amount of urea water flowing into the SCRF 51 is equivalent to the urea water addition amount from the urea water addition valve 53. However, when such a configuration that an SCR catalyst is arranged between a urea water addition valve and a filter is employed, the flow rate of urea water that flows out from the SCR catalyst without being hydrolyzed in the SCR catalyst is input to the deposition ratio estimation unit 121 as the amount of urea water flowing into the filter. The deposition ratio estimation unit 121 calculates a deposition ratio (e.g., the ratio of the amount of urea deposit produced to the amount of urea water flowing into the SCRF 51) on the basis of the input amount of urea water flowing into the SCRF 51 and the input temperature of the SCRF 51. As the amount of inflow urea water increases, urea water is more difficult to vaporize. Therefore, as the amount of inflow urea water increases, the deposition ratio increases. As the temperature of the SCRF 51 decreases, urea water is more difficult to vaporize. Therefore, as the temperature of the SCRF 51 decreases, the deposition ratio increases. The flow rate of exhaust gas is input to the accumulation ratio estimation unit 122. The accumulation ratio estimation unit 122 calculates an accumulation ratio (e.g., the ratio of a urea deposit that accumulates in the SCRF 51 to the amount of urea deposit produced) on the basis of the input flow rate of exhaust gas. As the flow rate of exhaust gas decreases, a urea deposit is more easy to accumulate in the SCRF 51. Therefore, as the flow rate of exhaust gas decreases, the accumulation ratio increases.

The amount of area water flowing into the SCRF 51, the deposition ratio calculated by the deposition ratio estimation unit 121 and the accumulation ratio calculated by the accumulation ratio estimation unit 122 are input to the deposit accumulation amount counter 123. The deposit accumulation amount counter 123 calculates the amount of urea deposit accumulated per unit time (hereinafter, which may also be referred to as "unit deposit accumulation amount") in the SCRF 51 by multiplying the amount of urea water flowing into the SCRF 51 by the deposition ratio and the accumulation ratio. In addition, the calculated unit deposit accumulation amount is integrated.

In addition to the second estimated amount that is the current estimated deposit accumulation amount in the SCRF 51, calculated by the deposit accumulation amount counter 123, the temperature of the SCRF 51 is input to the unit deposit separation amount estimation unit 124. The unit deposit separation amount estimation unit 124 calculates a deposit separation amount per unit time (hereinafter, which may also be referred to as "unit deposit separation amount") in the SCRF 51 on the basis of the input current deposit accumulation amount in the SCRF 51 and the current temperature of the SCRF 51. Then, the calculated unit deposit separation amount is input to the deposit accumulation amount counter 123. The deposit accumulation amount counter 123 calculates the current second estimated amount by subtracting the unit deposit separation amount from the integrated value of the unit deposit accumulation amount calculated as described above.

The amount of separated PM at the time when PM separates from the SCRF 51 with the separation of a urea deposit correlates with the amount of urea deposit accumulated in the SCRF 51. That is, under the condition that the temperature of the SCRF 51 is the same, the unit deposit separation amount increases as the amount of urea deposit accumulated in the SCRF 51 increases. As the amount of separated urea deposit increases, the amount of separated PM that separates from the SCRF 51 as a result of the separation of the urea deposit increases. Therefore, as the amount of separated urea deposit in the SCRF 51 increases, the amount of separated PM that separates from the SCRF 51 as a result of the separation of the urea deposit increases.

Figure 11:
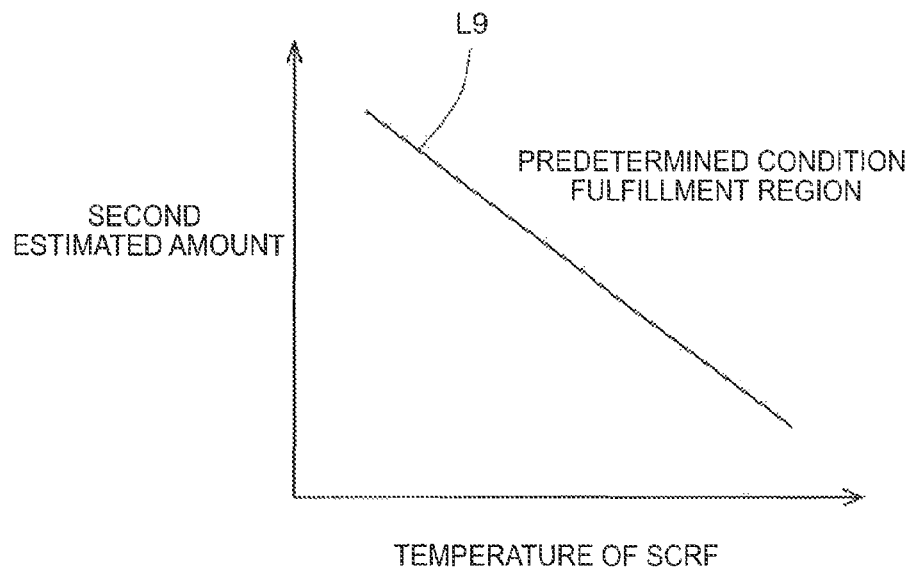
FIG. 11 is a map that shows the correlation between both the temperature of the SCRF and a second estimated amount and a region in which a predetermined condition is satisfied.

In the present embodiment, the predetermined condition is defined on the basis of the temperature of the SCRF 51 and the second estimated amount. That is, in the present embodiment, the predetermined condition is defined as a condition that the temperature of the SCRF 51 is higher than or equal to a predetermined temperature and the second estimated amount is larger than or equal to a second predetermined amount. The predetermined temperature and the second predetermined amount at this time are determined by using the map shown in FIG. 11. In FIG. 11, the abscissa axis represents the temperature of the SCRF 51, and the ordinate axis represents the second estimated amount. The line L9 indicates the boundary of a region in which the predetermined condition is satisfied. As shown in FIG. 11, as the second estimated amount increases, the predetermined condition is satisfied even when the temperature of the SCRF 51 is a lower temperature. As the temperature of the SCRF 51 rises, the predetermined condition is satisfied even when the second estimated amount is a smaller amount. That is, the line L9 shown in FIG. 11 indicates the correlation between the second estimated amount and the predetermined temperature, and the predetermined temperature is set to a lower temperature as the second estimated amount increases. The line L9 in FIG. 11 indicates the correlation between the temperature of the SCRF 51 and the second predetermined amount, and the second predetermined amount is set to a smaller value as the temperature of the SCRF 51 rises.

Figure 12:
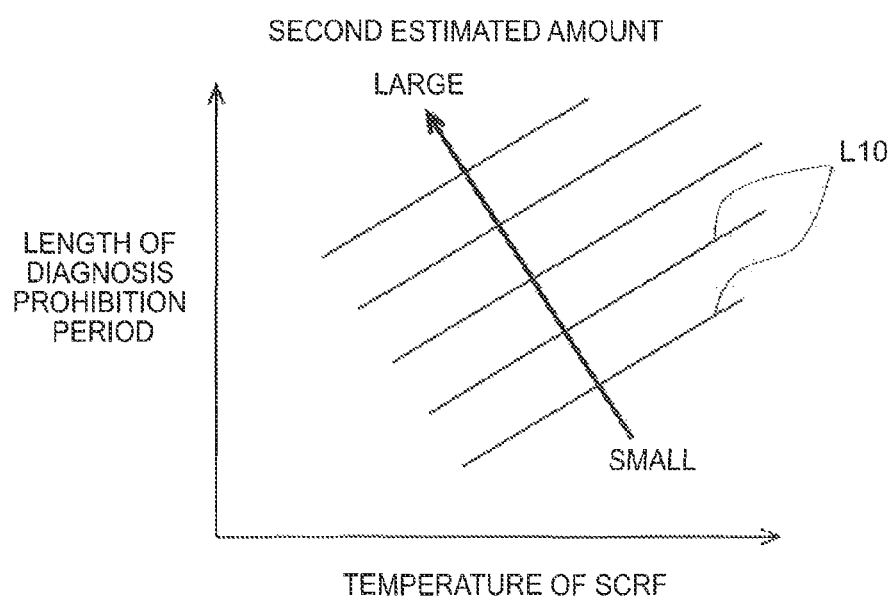
FIG. 12 is a map that shows the correlation between both the temperature of the SCRF and the second estimated amount at the point in time, at which the ECU determines that the predetermined condition is satisfied, and the length of a diagnosis prohibition period according to the second embodiment.

In the present embodiment, the length of the diagnosis prohibition period is set on the basis of the temperature of the SCRF 51 and the second estimated amount at the point in time at which the ECU 10 determines that the above-described predetermined condition is satisfied. FIG. 12 is a map that shows the correlation between both the temperature of the SCRF 51 and the second estimated amount at the point in time, at which the ECU 10 determines that the predetermined condition is satisfied, and the length of the diagnosis prohibition period. In FIG. 12, each line L10 indicates the correlation between the temperature of the SCRF 51 at the point in time, at which it is determined that the predetermined condition is satisfied, and the length of the diagnosis prohibition period. In the map shown in FIG. 10, the correlation between the temperature of the SCRF 51 and the length of the diagnosis prohibition period is set in response to the second estimated amount at the point in time at which it is determined that the predetermined condition is satisfied, is set. As described above, as the temperature of the SCRF 51 at the point in time, at which the ECU 10 determines that the predetermined condition is satisfied, rises, the amount of separated PM increases. As the second estimated amount at the point in time, at which the ECU 10 determines that the predetermined condition is satisfied, increases, the amount of separated PM increases. Therefore, as shown in FIG. 12, as the temperature of the SCRF 51 rises or as the second estimated amount increases, the diagnosis prohibition period is set to a longer period. By setting the diagnosis prohibition period in this way as well, it is possible to set the diagnosis prohibition period to a further appropriate period.

Flow of Setting Diagnosis Prohibition Period

Figure 13:
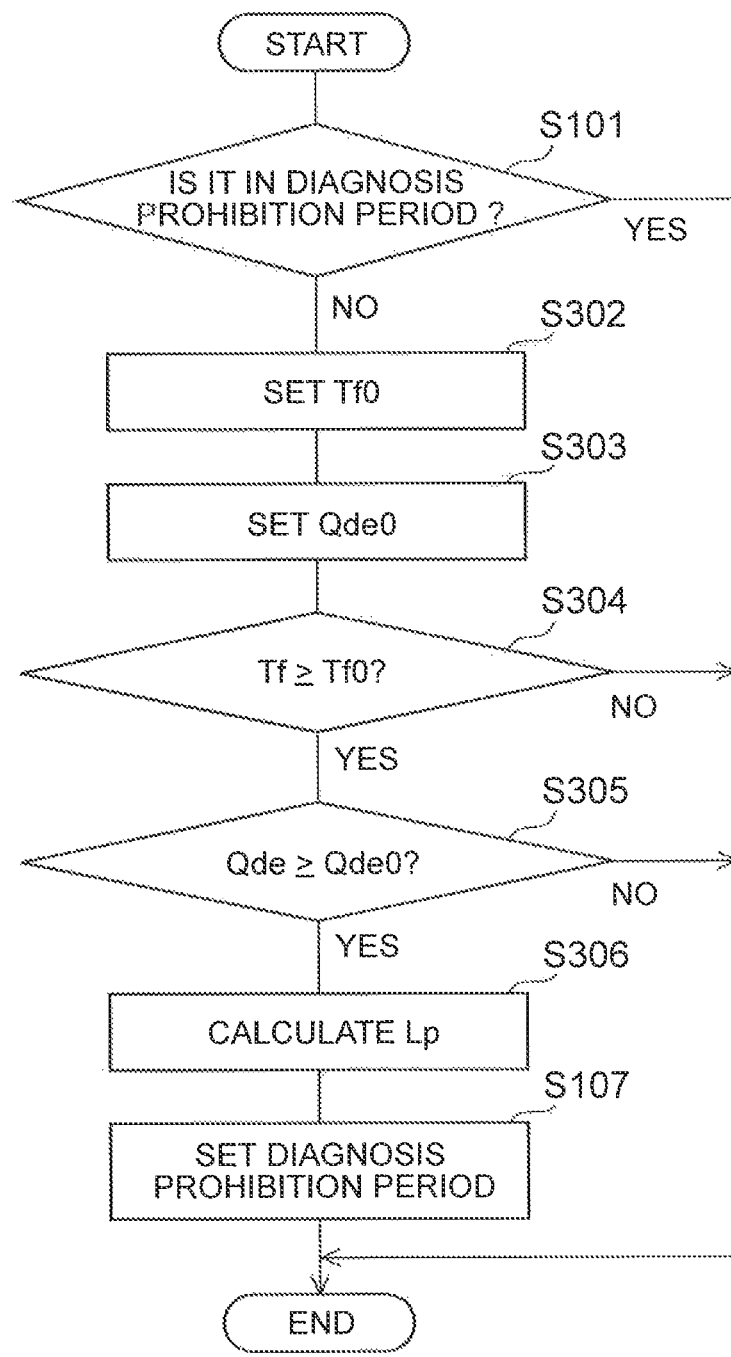
FIG. 13 is a flowchart that shows the flow of setting the diagnosis prohibition period according to the second embodiment.

Hereinafter, the flow for setting the diagnosis prohibition period according to the present embodiment will be described with reference to FIG. 13. FIG. 13 is a flowchart that shows the flow of setting the diagnosis prohibition period according to the present embodiment. In the flow shown in FIG. 13, S101 and S107 are steps in which similar processes to those of S101 and S107 in the flow shown in FIG. 7 are executed. Therefore, the description of these steps is omitted. The flow is stored in the ECU 10 in advance, and is repeatedly executed by the ECU 10 at predetermined intervals during operation of the internal combustion engine 1.

In this flow, when negative determination is made in S101, the predetermined temperature Tf0 is subsequently set in S302 on the basis of a current second estimated amount Qde that is calculated by the deposit accumulation amount estimation unit 120. Subsequently, in S303, a second predetermined amount Qde0 is set on the basis of the current temperature Tf of the SCRF 51, which is estimated on the basis of the output value of the downstream temperature sensor 56. In S302 and S303, the predetermined temperature Tf0 and the second predetermined amount Qde0 are set by using the map shown in FIG. 11.

Subsequently, in S304, it is determined whether the current temperature Tf of the SCRF 51 is higher than or equal to the predetermined temperature Tf0 set in S302. When negative determination is made in S304, execution of the flow is once ended. On the other hand, when affirmative determination is made in S304, it is subsequently determined in S305 whether the current second estimated amount Qde is larger than or equal to the second predetermined amount Qde0 set in S303. When negative determination is made in S305, execution of the flow is once ended.

On the other hand, when affirmative determination is made in S305, it may be determined that the predetermined condition according to the present embodiment is satisfied. In this case, subsequently, in S306, the length Lp of the diagnosis prohibition period is calculated on the basis of the current temperature Tf of the SCRF 51 and the current second estimated amount Qde. In S306, the length Lp of the diagnosis prohibition period is calculated by using the map shown in FIG. 12.

In the present embodiment, as for the predetermined temperature and the second predetermined amount that define the predetermined condition, as shown in FIG. 11, the predetermined temperature is continuously changed in response to the second estimated amount. The second predetermined amount is continuously changed in response to the temperature of the SCRF 51. However, the predetermined temperature may be changed for the second estimated amount in a stepwise manner. The second predetermined amount may be changed for the temperature of the SCRF 51 in a stepwise manner. One of the predetermined temperature and the second predetermined amount may be set to a predetermined constant value. However, as described above, it is possible to define the predetermined condition as a further appropriate condition by setting the predetermined temperature to a value commensurate with the second estimated amount and setting the second predetermined amount to a value commensurate with the temperature of the SCRF 51. That is, it is possible to reduce an unnecessary diagnosis prohibition period.

As in the case of the present embodiment, when the ECU 10 includes the deposit accumulation amount estimation unit 120 in addition to the PM accumulation amount estimation unit 110, the predetermined condition may be defined on the basis of the first estimated amount, the temperature of the SCRF 51 and the second estimated amount. For example, as in the case of the first embodiment, when the predetermined condition is defined as a condition that the temperature of the SCRF 51 is higher than or equal to the predetermined temperature and the first estimated amount is larger than or equal to the first predetermined amount, the predetermined temperature may be set to a lower temperature as the first estimated amount increases or as the second estimated amount increases. In this case, the first predetermined amount may be set to a smaller value as the temperature of the SCRF 51 rises or as the second estimated amount increases.

As in the case of the present embodiment, when the predetermined condition is defined as a condition that the temperature of the SCRF 51 is higher than or equal to the predetermined temperature and the second estimated amount is larger than or equal to the second predetermined amount as well, the predetermined temperature may be set to a lower temperature as the first estimated amount increases or as the second estimated amount increases. In this case, the second predetermined amount may be set to a smaller value as the temperature of the SCRF 51 rises or as the first estimated amount increases. In this way, by defining the predetermined condition on the basis of the first estimated amount, the temperature of the SCRF 51 and the second estimated amount, it is possible to reduce an unnecessary diagnosis prohibition period as much as possible.

In the present embodiment as well, the length of the diagnosis prohibition period may be set on the basis of one of the temperature of the SCRF 51 and the second estimated amount at the point in time at which the ECU 10 determines that the predetermined condition is satisfied. The length of the diagnosis prohibition period may be changed in a stepwise manner for the temperature of the SCRF 51 or the second estimated amount at the point in time at which the ECU 10 determines that the predetermined condition is satisfied. The length of the diagnosis prohibition period may be set on the basis of the first estimated amount, the temperature of the SCRF 51 and the second estimated amount at the point in time at which the ECU 10 determines that the predetermined condition is satisfied.

Alternative Embodiment

In an alternative embodiment to the present embodiment, as in the case of the alternative embodiment to the first embodiment, the diagnosis prohibition period is set as a period that is taken until the amount of increase in first estimated amount from the point in time at which the ECU 10 determines that the predetermined condition is satisfied reaches a predetermined increasing amount. In this case, as the temperature of the SCRF 51 at the point in time, at which it is determined that the predetermined condition is satisfied, rises or as the second estimated amount at this point in time increases, the predetermined increasing amount is set to a larger value. With this configuration as well, when the ECU 10 determines that the predetermined condition is satisfied and when it is estimated that the amount of PM that separates from the SCRF 51 as a result of fulfillment of the predetermined condition is large, the predetermined increasing amount is set to a larger value as compared to when it is estimated that the amount of separated PM is small.

Therefore, according to the present alternative embodiment, it is possible to set the diagnosis prohibition period to a further appropriate period. The predetermined increasing amount may be set on the basis of one of the temperature of the SCRF 51 and the second estimated amount at the point in time at which the ECU 10 determines that the predetermined condition is satisfied. The predetermined increasing amount may be changed in a stepwise manner for the temperature of the SCRF 51 or the second estimated amount at the point in time at which the ECU 10 determines that the predetermined condition is satisfied. In the present alternative embodiment as well, the predetermined increasing amount may be set in consideration of the first estimated amount at the point in time at which the ECU 10 determines that the predetermined condition is satisfied. That is, in the present alternative embodiment as well, the predetermined increasing amount may be set to a larger value as the first estimated amount at the point in time, at which the ECU 10 determines that the predetermined condition is satisfied, increases.

Third Embodiment

In the present embodiment, as in the case of the first embodiment, the predetermined condition is defined on the basis of the temperature of the SCRF 51 and the first estimated amount. In the present embodiment as well, the ECU 10 determines whether the predetermined condition is satisfied. In the present embodiment, when the ECU 10 determines that the predetermined condition is satisfied, a predetermined correction period for correcting a determination threshold that is used in the malfunction diagnosis process for the SCRF is provided instead of the predetermined diagnosis prohibition period. At this time, the length of the correction period, as well as the length of the diagnosis prohibition period according to the first embodiment, is set to a length longer than or equal to a period that is estimated to be minimally required from the beginning of a decrease in the filter differential pressure due to the separation of PM from the SCRF 51 to the recovery of the filter differential pressure. Specifically, the length of the correction period is set by a similar method to the method for setting the length of the diagnosis prohibition period according to the first embodiment.

In the correction period, the determination differential pressure for the first estimated amount is corrected to a smaller value as compared to the case where it is determined that the predetermined condition is not satisfied, and then the malfunction diagnosis process for the SCRF is executed. By making such a correction and then executing the malfunction diagnosis process, even when the filter differential pressure has decreased because of the separation of PM from the SCRF 51 with the separation of a urea deposit, it is more difficult to be diagnosed that there is a malfunction in the SCRF 51 as compared to the case where the malfunction diagnosis process is executed without any correction. Therefore, according to the present embodiment as well, it is possible to reduce erroneous diagnosis in diagnosing a malfunction in the SCRF.

In the present embodiment, the determination differential pressure that is calculated by a similar method to that of the first embodiment on the basis of the first estimated amount is referred to as "reference determination differential pressure". In the correction period according to the present embodiment, a corrected determination differential pressure is calculated by multiplying the reference determination differential pressure by a correction coefficient x, and the malfunction diagnosis process for the SCRF is executed by using the corrected determination differential pressure. The correction coefficient x is a positive value smaller than 1. When it is estimated that the amount of separated PM that separates from the SCRF 51 as a result of fulfillment of the predetermined condition is large, the correction coefficient x is set such that the corrected determination differential pressure becomes a smaller value with respect to the reference determination differential pressure, as compared to when it is estimated that the amount of separated PM is small. With this configuration, it is possible to reduce erroneous diagnosis in diagnosing a malfunction in the SCRF at higher probability.

Figure 14:
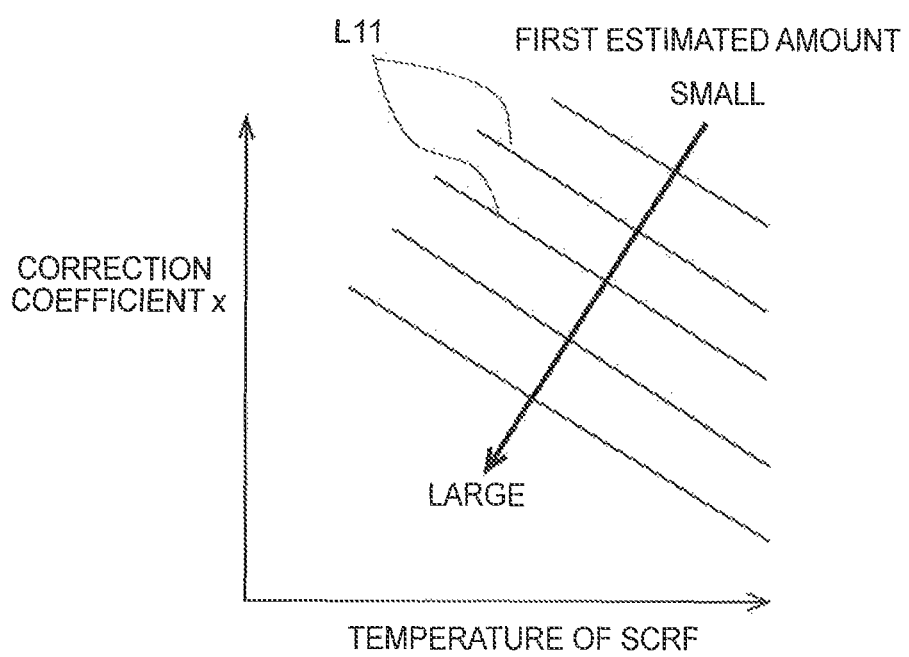
FIG. 14 is a map that shows the correlation between both the temperature of the SCRF and the first estimated amount at the point in time, at which the ECU determines that a predetermined condition is satisfied, and a correction coefficient x according to a third embodiment.

Specifically, in the present embodiment, the correction coefficient x is set on the basis of the temperature of the SCRF 51 and the first estimated amount at the point in time at which the ECU 10 determines that the predetermined condition is satisfied. FIG. 14 is a map that shows the correlation between both the temperature of the SCRF 51 and the first estimated amount at the point in time, at which the ECU 10 determines that the predetermined condition is satisfied, and the correction coefficient x. In FIG. 14, each line L11 indicates the correlation between the temperature of the SCRF 51 at the point in time, at which the ECU 10 determines that the predetermined condition is satisfied, and the correction coefficient x. In the map shown in FIG. 14, the correlation between the temperature of the SCRF 51 and the correction coefficient x, corresponding to the first estimated amount at the point in time at which the ECU 10 determines that the predetermined condition is satisfied, is set. As shown in FIG. 14, the correction coefficient x is set to a smaller value as the temperature of the SCRF 51 rises or as the first estimated amount increases. Thus, the corrected determination differential pressure becomes a smaller value with respect to the reference determination differential pressure as the temperature of the SCRF 51 rises or as the first estimated amount increases. Therefore, the corrected determination differential pressure becomes a smaller value with respect to the reference determination differential pressure as the amount of separated PM increases.

Flow of Setting Correction Period

Figure 15:
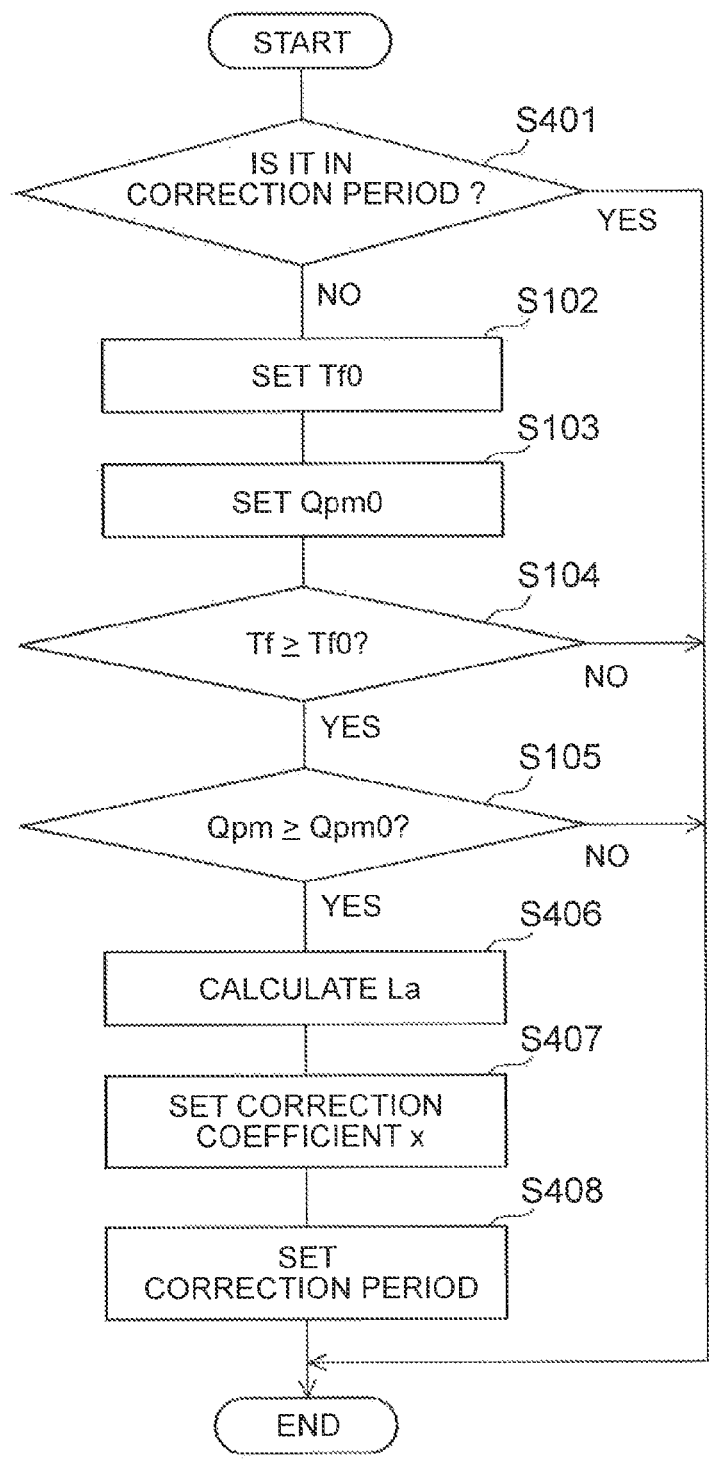
FIG. 15 is a flowchart that shows the flow of setting a diagnosis prohibition period according to the third embodiment.

Hereinafter, the flow for setting the correction period according to the present embodiment will be described with reference to FIG. 15. FIG. 15 is a flowchart that shows the flow of setting the correction period according to the present embodiment. In the flow shown in FIG. 15, S102 to S105 are steps in which similar processes to those of S102 to S105 in the flow shown in FIG. 7 are executed. Therefore, the description of these steps is omitted. The flow is stored in the ECU 10 in advance, and is repeatedly executed by the ECU 10 at predetermined intervals during operation of the internal combustion engine 1.

In this flow, initially, in S401, it is determined whether it is currently in the correction period. When affirmative determination is made in S401, execution of the flow is once ended. On the other hand, when negative determination is made in S401, the process of S102 is subsequently executed.

In this flow, when affirmative determination is made in S105, it may be determined that the predetermined condition according to the present embodiment is satisfied. In this case, subsequently, in S406, the length La of the correction period is calculated on the basis of the current temperature Tf of the SCRF 51 and the current first estimated amount Qpm. Here, the length La of the correction period is calculated by a similar method to the method of calculating the length Lp of the diagnosis prohibition period in S106 of the flow shown in FIG. 7. Therefore, the length La of the correction period is calculated as a longer period as the current temperature of the SCRF 51 rises or as the current first estimated amount increases.

Subsequently, in S407, the correction coefficient x is set on the basis of the current temperature Tf of the SCRF 51 and the current first estimated amount Qpm. In S407, the correction coefficient x is set by using the map shown in FIG. 14. The correction coefficient x is stored in the ECU 10. Subsequently, in S408, the period of the length La calculated in S406 from the current point in time, that is, the point in time at which it is determined that the predetermined condition is satisfied, is set as the correction period.

Flow of Diagnosing Malfunction in SCRF

Figure 16:
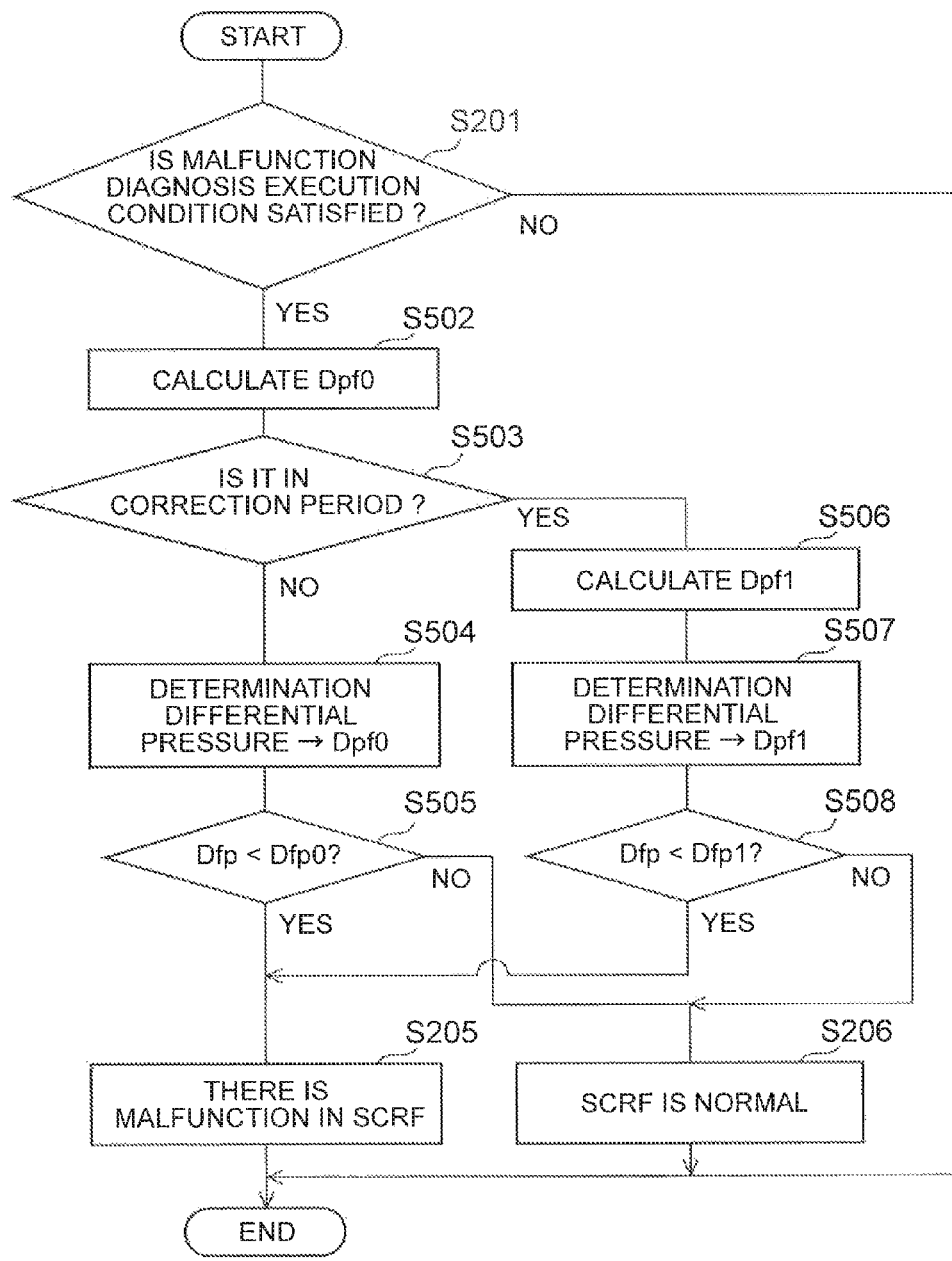
FIG. 16 is a flowchart that shows the flow of diagnosing whether there is a malfunction in the SCRF according to the third embodiment.

Next, the flow of diagnosing a malfunction in the SCRF according to the present embodiment will be described with reference to FIG. 16. FIG. 16 is a flowchart that shows the flow of diagnosing a malfunction in the SCRF according to the present embodiment. In the flow shown in FIG. 16, S201, S205 and S206 are steps in which similar processes to those of S201, S205 and S206 in the flow shown in FIG. 8 are executed. Therefore, the description of these steps is omitted. The flow is stored in the ECU 10 in advance, and is repeatedly executed by the ECU 10 at predetermined intervals during operation of the internal combustion engine 1.

In this flow, when affirmative determination is made in S201, the reference determination differential pressure Dfp0 is set in S502 on the basis of a current first estimated amount Qpm that is calculated by the PM accumulation amount estimation unit 110. Here, the reference determination differential pressure Dfp0 is set by using a similar map to the map that is used at the time when the determination differential pressure is set in S203 of the flow shown in FIG. 8. Subsequently, in S503, it is determined whether it is currently in the correction period set by the flow shown in FIG. 15.

When negative determination is made in S503, the reference determination differential pressure Dfp0 calculated in S502 is subsequently set in S504 as the determination differential pressure. Subsequently, the malfunction diagnosis process is executed in S505. In S505, it is determined whether the actual filter differential pressure Dfp that is detected by the differential pressure sensor 59 is smaller than the reference determination differential pressure Dfp0 set as the determination differential pressure in S504. When affirmative determination is made in S505, it is subsequently determined in S205 that there is a malfunction in the SCRF 51. On the other hand, when negative determination is made in S505, it is subsequently determined in S206 that the SCRF 51 is in the normal state.

On the other hand, when affirmative determination is made in S503, that is when it is currently in the correction period, a corrected determination differential pressure Dfp1 is subsequently calculated in S506 by multiplying the reference determination differential pressure Dfp0 calculated in S502 by the correction coefficient x that is set in S407 of the flow shown in FIG. 15 and stored in the ECU 10. Subsequently, in S507, the corrected determination differential pressure Dfp1 calculated in S506 is set as the determination differential pressure. Subsequently, in S508, the malfunction diagnosis process is executed. In S508, it is determined whether the actual filter differential pressure Dfp that is detected by the differential pressure sensor 59 is smaller than the corrected determination differential pressure Dfp1 set in S507 as the determination differential pressure. When affirmative determination is made in S508, it is subsequently determined in S205 that there is a malfunction in the SCRF 51. On the other hand, when negative determination is made in S508, it is subsequently determined in S206 that the SCRF 51 is in the normal state.

In the present embodiment, the length of the correction period is set on the basis of the temperature of the SCRF 51 and the first estimated amount at the point in time at which the ECU 10 determines that the predetermined condition is satisfied. However, the length of the correction period may be set to a predetermined constant length. However, as described above, it is possible to set the correction period to a further appropriate period by setting the length of the correction period on the basis of the temperature of the SCRF 51 and the first estimated amount. The length of the correction period may be set on the basis of one of the temperature of the SCRF 51 and the first estimated amount at the point in time at which the ECU 10 determines that the predetermined condition is satisfied. The length of the correction period may be changed in a stepwise manner for the temperature of the SCRF 51 or the first estimated amount at the point in time at which the ECU 10 determines that the predetermined condition is satisfied.

In the present embodiment, the correction coefficient x is set on the basis of the temperature of the SCRF 51 and the first estimated amount at the point in time at which the ECU 10 determines that the predetermined condition is satisfied. However, the correction coefficient x may be set to a predetermined constant value. However, as described above, it is possible to set the corrected determination differential pressure to a further appropriate value by setting the correction coefficient x on the basis of the temperature of the SCRF 51 and the first estimated amount. The correction coefficient x may be set on the basis of one of the temperature of the SCRF 51 and the first estimated amount at the point in time at which the ECU 10 determines that the predetermined condition is satisfied. The correction coefficient x may be changed in a stepwise manner for the temperature of the SCRF 51 or the first estimated amount at the point in time at which the ECU 10 determines that the predetermined condition is satisfied.

First Alternative Embodiment

In a first alternative embodiment to the present embodiment, as in the case of the second embodiment, the ECU 10 includes the deposit accumulation amount estimation unit 120. In the present alternative embodiment, as in the case of the second embodiment, the predetermined condition is defined on the basis of the temperature of the SCRF 51 and the second estimated amount. That is, in the present alternative embodiment, the predetermined condition is defined as a condition that the temperature of the SCRF 51 is higher than or equal to a predetermined temperature and the second estimated amount is larger than or equal to a second predetermined amount. In addition, in the present alternative embodiment, the length of the correction period is set by a similar method to the method for setting the length of the diagnosis prohibition period according to the second embodiment. That is, in the present alternative embodiment, the length of the correction period is set on the basis of the temperature of the SCRF 51 and the second estimated amount at the point in time at which the ECU 10 determines that the predetermined condition is satisfied.

In the present alternative embodiment, the correction coefficient x that is used to calculate the corrected determination differential pressure in the correction period is set on the basis of the temperature of the SCRF 51 and the second estimated amount at the point in time at which the ECU 10 determines that the predetermined condition is satisfied.

Figure 17:
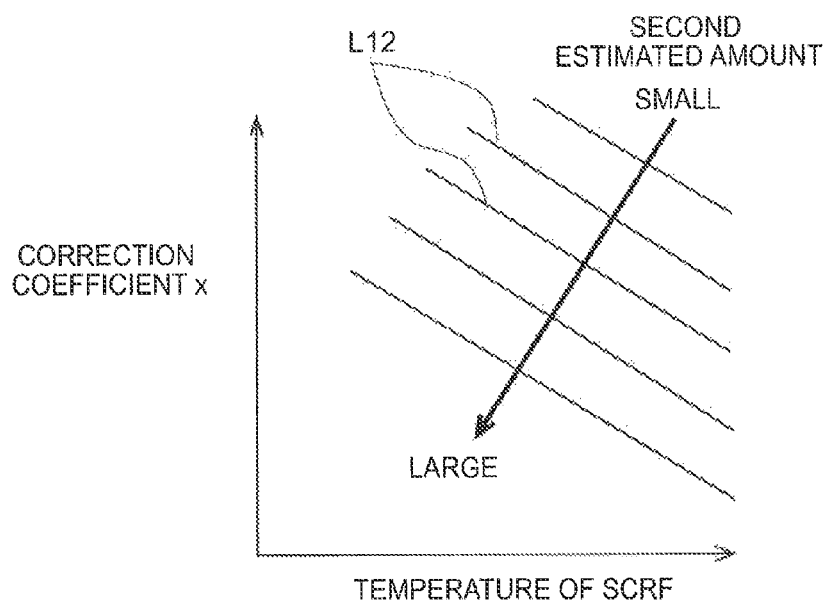
FIG. 17 is a map that shows the correlation between both the temperature of the SCRF and the second estimated amount at the point in time, at which the ECU determines that a predetermined condition is satisfied, and the correction coefficient x according to a first alternative embodiment to the third embodiment.

FIG. 17 is a map that shows the correlation between both the temperature of the SCRF 51 and the second estimated amount at the point in time, at which the ECU 10 determines that the predetermined condition is satisfied, and the correction coefficient x. In FIG. 17, each line L12 indicates the correlation between the temperature of the SCRF 51 at the point in time, at which the ECU 10 determines that the predetermined condition is satisfied, and the correction coefficient x. In the map shown in FIG. 17, the correlation between the temperature of the SCRF 51 and the correction coefficient x, corresponding to the second estimated amount at the point in time at which it is determined that the predetermined condition is satisfied, is set. As shown in FIG. 17, the correction coefficient x is set to a smaller value as the temperature of the SCRF 51 rises or as the second estimated amount increases. Thus, the corrected determination differential pressure becomes a smaller value with respect to the reference determination differential pressure as the temperature of the SCRF 51 rises or as the second estimated amount increases. Therefore, the corrected determination differential pressure becomes a smaller value with respect to the reference determination differential pressure as the amount of separated PM increases.

In the present alternative embodiment, the length of the correction period may be set on the basis of one of the temperature of the SCRF 51 and the second estimated amount at the point in time at which the ECU 10 determines that the predetermined condition is satisfied. The length of the correction period may be changed in a stepwise manner for the temperature of the SCRF 51 or the second estimated amount at the point in time at which the ECU 10 determines that the predetermined condition is satisfied. The length of the correction period may be set on the basis of the first estimated amount, the temperature of the SCRF 51 and the second estimated amount at the point in time at which the ECU 10 determines that the predetermined condition is satisfied.

In the present alternative embodiment, the correction coefficient x may be set on the basis of one of the temperature of the SCRF 51 and the second estimated amount at the point in time at which the ECU 10 determines that the predetermined condition is satisfied. The correction coefficient x may be changed in a stepwise manner for the temperature of the SCRF 51 or the second estimated amount at the point in time at which the ECU 10 determines that the predetermined condition is satisfied. In the present alternative embodiment as well, the correction coefficient x may be set in consideration of the first estimated amount at the point in time at which the ECU 13 determines that the predetermined condition is satisfied. The correction coefficient x may be set on the basis of the first estimated amount, the temperature of the SCRF 51 and the second estimated amount at the point in time at which the ECU 10 determines that the predetermined condition is satisfied.

Second Alternative Embodiment

In a second alternative embodiment to the present embodiment, when the malfunction diagnosis process for the SCRF is executed in the correction period, the filter differential pressure that is detected by the differential pressure sensor 59 is corrected instead of correcting the determination differential pressure. In this case, a corrected filter differential pressure is calculated by multiplying the actual filter differential pressure, which is detected by the differential pressure sensor 59, by a correction coefficient y, and then the malfunction diagnosis process for the SCRF is executed by using the corrected filter differential pressure. The correction coefficient y is a value larger than 1. When it is estimated that the amount of PM that separates from the SCRF 51 as a result of fulfillment of the predetermined condition is large, the correction coefficient y is set such that the corrected filter differential pressure becomes a larger value with respect to the actual filter differential pressure, as compared to when it is estimated that the amount of separated PM is small. With this configuration, it is possible to reduce erroneous diagnosis in diagnosing a malfunction in the SCRF at higher probability.

Figure 18:
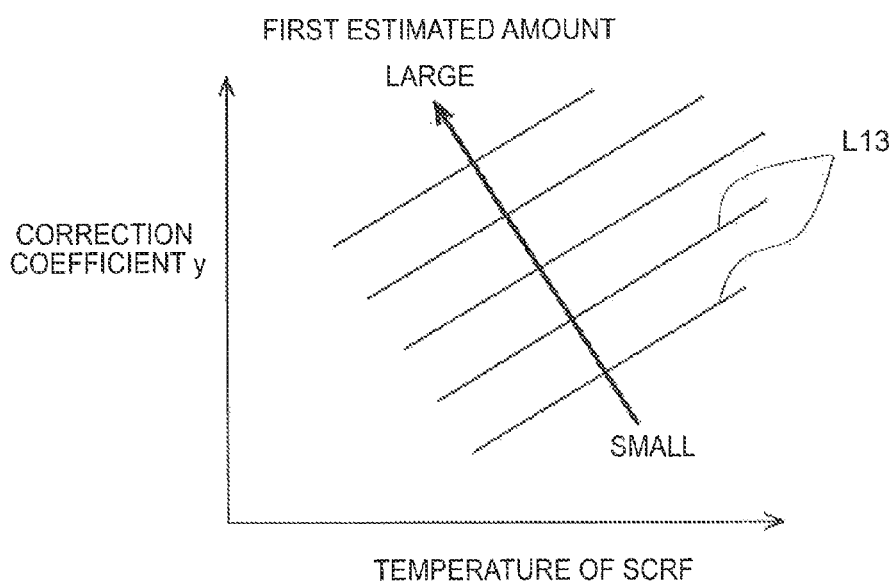
FIG. 18 is a map that shows the correlation between both the temperature of the SCRF and the first estimated amount at the point in time, at which the ECU determines that a predetermined condition is satisfied, and a correction coefficient y according to a second alternative embodiment to the third embodiment.

Specifically, in the present embodiment, the correction coefficient y is set on the basis of the temperature of the SCRF 51 and the first estimated amount at the point in time at which the ECU 10 determines that the predetermined condition is satisfied. FIG. 18 is a map that shows the correlation between both the temperature of the SCRF 51 and the first estimated amount at the point in time, at which the ECU 10 determines that the predetermined condition is satisfied, and the correction coefficient y. In FIG. 18, each line L13 indicates the correlation between the temperature of the SCRF 51 at the point in time, at which the ECU 10 determines that the predetermined condition is satisfied, and the correction coefficient y. In the map shown in FIG. 18, the correlation between the temperature of SCRF 51 and the correction coefficient y, corresponding to the first estimated amount at the point in time at which the ECU 10 determines that the predetermined condition is satisfied, is set. As shown in FIG. 18, the correction coefficient y is set to a larger value as the temperature of the SCRF 51 rises or as the first estimated amount increases. Thus, the corrected filter differential pressure becomes a larger value with respect to the actual filter differential pressure as the temperature of the SCRF 51 rises or as the first estimated amount increases. Therefore, as the amount of separated PM increases, the corrected filter differential pressure becomes a larger value with respect to the actual filter differential pressure.

The correction coefficient y may be set to a predetermined constant value. However, as described above, it is possible to set the corrected filter differential pressure to a further appropriate value by setting the correction coefficient y on the basis of the temperature of the SCRF 51 and the first estimated amount. The correction coefficient y may be set on the basis of one of the temperature of the SCRF 51 and the first estimated amount at the point in time at which the ECU 10 determines that the predetermined condition is satisfied. The correction coefficient y may be changed in a stepwise manner for the temperature of the SCRF 51 or the first estimated amount at the point in time at which the ECU 10 determines that the predetermined condition is satisfied.

Figure 19:
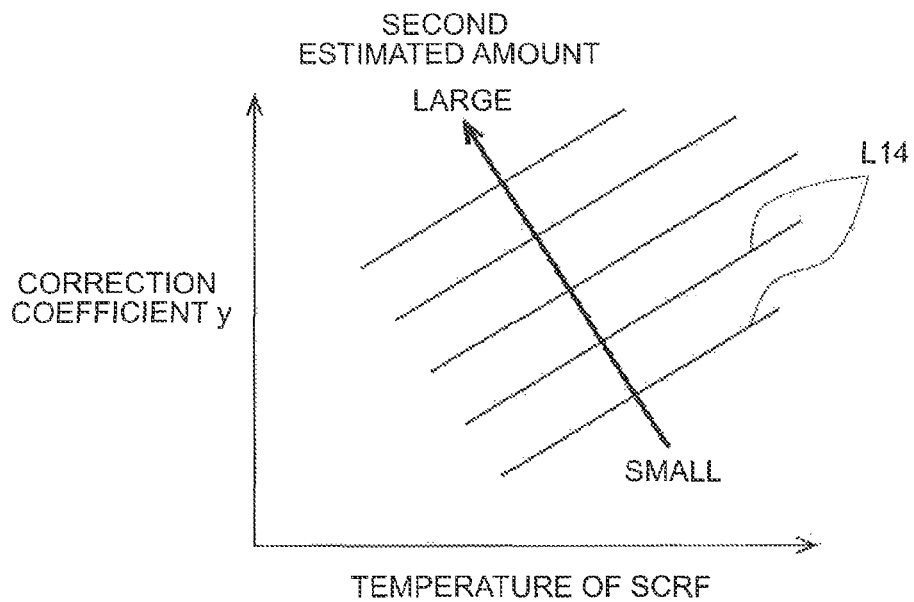
FIG. 19 is a map that shows the correlation between both the temperature of the SCRF and the second estimated amount at the point in time, at which the ECU determines that the predetermined condition is satisfied, and the correction coefficient y according to the second alternative embodiment to the third embodiment.

As in the case of the first alternative embodiment, when the ECU 10 includes the deposit accumulation amount estimation unit 120, the correction coefficient y is set on the basis of the temperature of the SCRF 51 and the second estimated amount at the point in time at which the ECU 10 determines that the predetermined condition is satisfied. FIG. 19 is a map that shows the correlation between both the temperature of the SCRF 51 and the second estimated amount at the point in time, at which the ECU 10 determines that the predetermined condition is satisfied, and the correction coefficient y. In FIG. 19, each line L14 indicates the correlation between the temperature of the SCRF 51 at the point in time, at which the ECU 10 determines that the predetermined condition is satisfied, and the correction coefficient y. In the map shown in FIG. 18, the correlation between the temperature of the SCRF 51 and the correction coefficient y, corresponding to the second estimated amount at the point in time at which it is determined that the predetermined condition is satisfied, is set. As shown in FIG. 19, the correction coefficient y is set to a smaller value as the temperature of the SCRF 51 rises or as the second estimated amount increases. Thus, the corrected filter differential pressure becomes a larger value with respect to the actual filter differential pressure as the temperature of the SCRF 51 rises or as the second estimated amount increases. Therefore, as the amount of separated PM increases, the corrected filter differential pressure becomes a larger value with respect to the actual filter differential pressure.

The correction coefficient y may be set on the basis of one of the temperature of the SCRF 51 and the second estimated amount at the point in time at which the ECU 10 determines that the predetermined condition is satisfied. The correction coefficient y may be changed in a stepwise manner for the temperature of the SCRF 51 or the second estimated amount at the point in time at which the ECU 10 determines that the predetermined condition is satisfied. The correction coefficient y may be set on the basis of the first estimated amount, the temperature of the SCRF 51 and the second estimated amount at the point in time at which the ECU 10 determines that the predetermined condition is satisfied. When the malfunction diagnosis process for the SCRF is executed in the correction period, both the above-described determination differential pressure and filter differential pressure may be corrected.

Third Alternative Embodiment

In a third alternative embodiment to the present embodiment, as in the case of the diagnosis prohibition period according to the alternative embodiments to the first and second embodiments, the correction period is set as a period that is taken until the amount of increase in first estimated amount from the point in time at which the ECU 10 determines that the predetermined condition is satisfied reaches a predetermined increasing amount. In this case, as the temperature of the SCRF 51 at the point in time, at which it is determined that the predetermined condition is satisfied, rises, as the first estimated amount at this point in time increases or as the second estimated amount at this point in time increases, the predetermined increasing amount is set to a larger value. With this configuration, when the ECU 10 determines that the predetermined condition is satisfied and when it is estimated that the amount of PM that separates from the SCRF 51 as a result of fulfillment of the predetermined condition is large, the predetermined increasing amount is set to a larger value as compared to when it is estimated that the amount of separated PM is small. Therefore, according to the present alternative embodiment, it is possible to set the correction period to a further appropriate period. In the present alternative embodiment as well, as in the case of the alternative embodiment to the first or second embodiment, the predetermined increasing amount may be changed in a stepwise manner for the temperature of the SCRF 51, the first estimated amount or the second estimated amount at the point in time at which the ECU 10 determines that the predetermined condition is satisfied.

Fourth Embodiment

In the present embodiment, as in the case of the second embodiment, the PM accumulation amount estimation unit 110 in the ECU 10 continuously estimates the first estimated amount. The deposit accumulation amount estimation unit 120 in the ECU 10 continuously calculates the second estimated amount. In the present embodiment, as in the case of the first or second embodiment, the predetermined condition is defined on the basis of at least any one of the temperature of the SCRF 51, the first estimated amount or the second estimated amount. In the present embodiment, when the ECU 10 determines that the predetermined condition is satisfied, execution of the malfunction diagnosis process for the SCRF 51 is prohibited until the ECU 10 determines that the predetermined condition is satisfied. In addition, execution of the malfunction diagnosis process for the SCRF 51 is prohibited also until an additional period elapses from the point in time at which the ECU 10 determines that the predetermined condition is not satisfied. That is in the present embodiment, a period obtained by adding the additional period to the period from when the ECU 10 determines that the predetermined condition is satisfied to when the ECU 10 determines that the predetermined condition is not satisfied, as the diagnosis prohibition period.

In the present embodiment, the ECU 10 calculates an estimated PM separation amount that is the estimated amount of separated PM in the period from when it is determined that the predetermined condition is satisfied to when the predetermined condition is not satisfied. Specifically, during the period in which the predetermined condition is satisfied, the amount of separated PM per unit time (hereinafter, which may also be referred to as "unit PM separation amount") is calculated on the basis of the temperature of the SCRF 51, the first estimated amount that is calculated by the PM accumulation amount estimation unit 110 and the second estimated amount that is calculated by the deposit accumulation amount estimation unit 120. The estimated PM separation amount is calculated by integrating the unit PM separation amount. The additional period is set to a longer period as the estimated PM separation amount increases. With this configuration, it is possible to set the diagnosis prohibition period as a period further corresponding to the amount of separated PM.

Flow of Setting Additional Period

Figure 20:
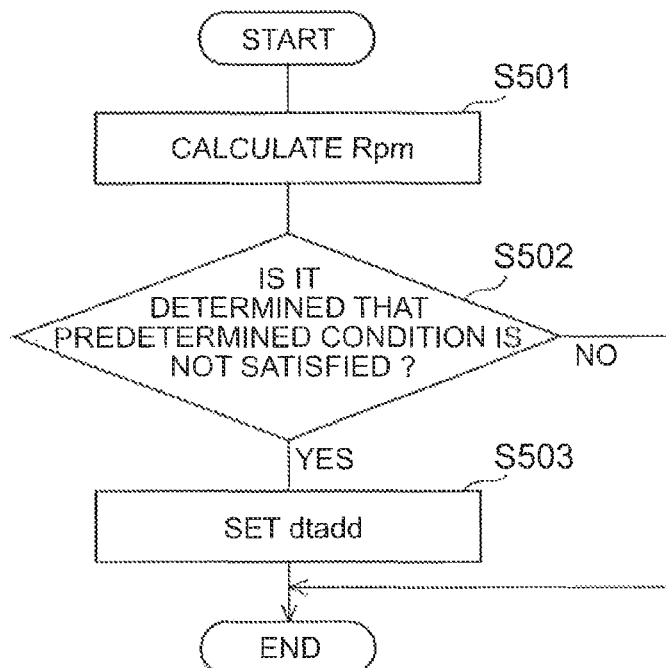
FIG. 20 is a flowchart that shows the flow of setting an additional period according to a fourth embodiment.

Hereinafter, the flow for setting the additional period according to the present embodiment will be described with reference to FIG. 20. FIG. 20 is a flowchart that shows the flow of setting the additional period according to the present embodiment. The flow is stored in the ECU 10 in advance, and is repeatedly executed by the ECU 10 at predetermined intervals while the predetermined condition according to the present embodiment is satisfied.

In this flow, initially, in S501, an estimated PM separation amount Rpm from when it is determined that the predetermined condition is satisfied to the current point in time is calculated by integrating the unit PM separation amount. Subsequently, in S502, it is determined whether the predetermined condition becomes unsatisfied. When negative determination is made in S502, execution of the flow is once ended. On the other hand, when affirmative determination is made in S502, an additional period dtadd is subsequently set in S503 on the basis of the estimated PM separation amount Rpm calculated in S501. The ECU 10 sets a period obtained by adding the additional period calculated in S503 to the period from when it is determined that the predetermined condition is satisfied to the current point in time, as the diagnosis prohibition period.

In the present embodiment, a period obtained by adding the additional period to the period from when the ECU 10 determines that the predetermined condition is satisfied to when the ECU 10 determines that the predetermined condition is not satisfied, as the correction period.

The above-described embodiments may be combined with each other where appropriate.

What is claimed is:

1. A diagnostic system for an internal combustion engine, the internal combustion engine including an exhaust gas control system and an exhaust passage,
the exhaust gas control system including:
a filter provided in the exhaust passage, the filter being configured to collect particulate matter in exhaust gas;
a selective reduction NOx catalyst provided in the exhaust passage, the selective reduction NOx catalyst being configured to reduce NOx in exhaust gas by using ammonia as a reducing agent; and
a urea water addition device provided in the exhaust passage at a portion upstream of the filter and the selective reduction NOx catalyst, the urea water addition device comprising a valve and being configured to add urea water into exhaust gas,
the diagnostic system comprising:
a differential pressure acquisition device configured to acquire a filter differential pressure, the differential pressure acquisition device comprising a differential pressure sensor, the filter differential pressure being a pressure difference in exhaust gas between an upstream side and downstream side of the filter; and
an electronic control unit configured to:
calculate a first estimated amount by using a parameter other than the filter differential pressure, the first estimated amount being an estimated amount of particulate matter accumulated in the filter;
set a determination differential pressure based on the first estimated amount;
execute a malfunction diagnosis process for diagnosing, when the filter differential pressure is smaller than the determination differential pressure, that there is a malfunction in the filter;
determine whether a predetermined condition is satisfied, the predetermined condition being a condition under which an amount of separated particulate matter is larger than or equal to a predetermined separation amount, the separated particulate matter being particulate matter that separates from the filter as a urea water-originated deposit once accumulated in the filter separates from the filter in gaseous form; and
when the predetermined condition is determined to be satisfied, delay executing the malfunction diagnosis process until a predetermined period of time elapses from when the predetermined condition is satisfied.

2. The diagnostic system according to claim 1, wherein the predetermined condition is a condition that a temperature of the filter is higher than or equal to a predetermined temperature and the first estimated amount is larger than or equal to a first predetermined amount, and
the electronic control unit is configured to set at least one of the predetermined temperature and the first predetermined amount, the predetermined temperature being set such that the predetermined temperature when the first estimated amount is large is lower than the predetermined temperature when the first estimated amount is small, and the first predetermined amount being set such that the first predetermined amount when the first estimated amount is large is smaller than the first predetermined amount when the first estimated amount is small.

3. The diagnostic system according to claim 2, wherein the electronic control unit is configured to calculate a second estimated amount, the second estimated amount being an estimated amount of urea water-originated deposit accumulated in the filter, and
the electronic control unit is configured to set at least one of the predetermined temperature and the first predetermined amount, the predetermined temperature being set such that the predetermined temperature when the second estimated amount is large is lower than the predetermined temperature when the second estimated amount is small, and the first predetermined amount being set such that the first predetermined amount when the second estimated amount is large is smaller than the first predetermined amount when the second estimated amount is small.

4. The diagnostic system according to claim 1, wherein the electronic control unit is configured to calculate a second estimated amount, the second estimated amount being an estimated amount of urea water-originated deposit accumulated in the filter,
the predetermined condition is a condition that a temperature of the filter is higher than or equal to a predetermined temperature and the second estimated amount is larger than or equal to a second predetermined amount, and
the electronic control unit is configured to set at least one of the predetermined temperature and the second predetermined amount, the predetermined temperature being set such that the predetermined temperature when the second estimated amount is large is lower than the predetermined temperature when the second estimated amount is small, and the second predetermined amount being set such that the second predetermined amount when the second estimated amount is large is smaller than the second predetermined amount when the second estimated amount is small.

5. The diagnostic system according to claim 4, wherein the electronic control unit is configured to set at least one of the predetermined temperature and the second predetermined amount, the predetermined temperature being set such that the predetermined temperature when the first estimated amount is large is lower than the predetermined temperature when the first estimated amount is small, and the second predetermined amount being set such that the second predetermined amount when the first estimated amount is large is smaller than the second predetermined amount when the first estimated amount is small.

6. The diagnostic system according to claim 1, wherein the electronic control unit is configured to, when the predetermined condition is satisfied, set the predetermined period such that the predetermined period at the time when the electronic control unit estimates that the amount of the separated particulate matter that separates from the filter as a result of fulfillment of the predetermined condition is large is longer than the predetermined period at the time when the electronic control unit estimates that the amount of the separated particulate matter is small.

7. The diagnostic system according to claim 6, wherein the electronic control unit is configured to set the predetermined period such that the predetermined period at the time when a temperature of the filter at a point in time at which the predetermined condition is satisfied is high is longer than the predetermined period at the time when the temperature of the filter at the point in time at which the predetermined condition is satisfied is low.

8. The diagnostic system according to claim 6, wherein the electronic control unit is configured to set the predetermined period such that the predetermined period at the time when the first estimated amount at a point in time at which the predetermined condition is satisfied is large is longer than the predetermined period at the time when the first estimated amount at the point in time at which the predetermined condition is satisfied is small.

9. The diagnostic system according to claim 6, wherein the electronic control unit is configured to calculate a second estimated amount, the second estimated amount being an estimated amount of urea water-originated deposit accumulated in the filter, and
the electronic control unit is configured to set the predetermined period such that the predetermined period at the time when the second estimated amount at a point in time at which the predetermined condition is satisfied is large is longer than the predetermined period at the time when the second estimated amount at the point in time at which the predetermined condition is satisfied is small.

10. The diagnostic system according to claim 1, wherein the predetermined period is a period from a point in time at which the predetermined condition is satisfied to a point in time at which an amount of increase in the first estimated amount reaches a predetermined increasing amount.

11. The diagnostic system according to claim 10, wherein the electronic control unit is configured to, when the predetermined condition is satisfied, set the predetermined increasing amount such that the predetermined increasing amount at the time when the electronic control unit estimates that the amount of the separated particulate matter that separates from the filter as a result of fulfillment of the predetermined condition is large is larger than the predetermined increasing amount at the time when the electronic control unit estimates that the amount of the separated particulate matter is small.

12. The diagnostic system according to claim 11, wherein the electronic control unit is configured to set the predetermined increasing amount such that the predetermined increasing amount at the time when a temperature of the filter at a point in time at which the predetermined condition is satisfied is high is larger than the predetermined increasing amount at the time when the temperature of the filter at the point in time at which the predetermined condition is satisfied is low.

13. The diagnostic system according to claim 11, wherein the electronic control unit is configured to set the predetermined increasing amount such that the predetermined increasing amount at the time when the first estimated amount at a point in time at which the predetermined condition is satisfied is large is larger than the predetermined increasing amount at the time when the first estimated amount at the point in time at which the predetermined condition is satisfied is small.

14. The diagnostic system according to claim 11, wherein the electronic control unit is configured to calculate a second estimated amount, the second estimated amount being an estimated amount of urea water-originated deposit accumulated in the filter, and
the electronic control unit is configured to set the predetermined increasing amount such that the predetermined increasing amount at the time when the second estimated amount at a point in time at which the predetermined condition is satisfied is large is larger than the predetermined increasing amount at the time when the second estimated amount at the point in time at which the predetermined condition is satisfied is small.

15. The diagnostic system according to claim 1, wherein the electronic control unit is configured to calculate an estimated particulate matter separation amount that is an estimated amount of the separated particulate matter in a period from when the predetermined condition is satisfied to when the predetermined condition is not satisfied, the predetermined period being a period obtained by adding an additional period to the period from when the predetermined condition is satisfied to when the predetermined condition is not satisfied, and
the electronic control unit is configured to set the additional period to a longer period as the estimated particulate matter separation amount increases.

16. A diagnostic system for an internal combustion engine, the internal combustion engine including an exhaust gas control system and an exhaust passage,
the exhaust gas control system including:
a filter provided in the exhaust passage, the filter being configured to collect particulate matter in exhaust gas;
a selective reduction NOx catalyst provided in the exhaust passage, the selective reduction NOx catalyst being configured to reduce NOx in exhaust gas by using ammonia as a reducing agent; and
a urea water addition device provided in the exhaust passage at a portion upstream of the filter and the selective reduction NOx catalyst, the urea water addition device comprising a valve and being configured to add urea water into exhaust gas,
the diagnostic system comprising:
a differential pressure acquisition device configured to acquire a filter differential pressure, the differential pressure acquisition device comprising a differential pressure sensor, the filter differential pressure being a pressure difference in exhaust gas between an upstream side and downstream side of the filter; and
an electronic control unit configured to:
calculate a first estimated amount by using a parameter other than the filter differential pressure, the first estimated amount being an estimated amount of particulate matter accumulated in the filter;
set a determination differential pressure based on the first estimated amount;
execute a malfunction diagnosis process for diagnosing, when the filter differential pressure is smaller than the determination differential pressure, that there is a malfunction in the filter;
determine whether a predetermined condition is satisfied, the predetermined condition being a condition under which an amount of separated particulate matter is larger than or equal to a predetermined separation amount, the separated particulate matter being particulate matter that separates from the filter as a urea water-originated deposit once accumulated in the filter separates from the filter in gaseous form; and
during a predetermined period from a point in time at which the predetermined condition is satisfied, correct at least one of the filter differential pressure and the determination differential pressure for the first estimated amount at a time of executing the malfunction diagnosis process, and execute the malfunction diagnosis process, the filter differential pressure being corrected such that the filter differential pressure when the predetermined condition is satisfied is larger than the filter differential pressure when the predetermined condition is not satisfied, and the determination differential pressure being corrected such that the determination differential pressure when the predetermined condition is satisfied is smaller than the determination differential pressure when the predetermined condition is not satisfied.

17. The diagnostic system according to claim 16, wherein the electronic control unit is configured to, when the electronic control unit determines that the predetermined condition is satisfied, correct at least one of the determination differential pressure and the filter differential pressure, the determination differential pressure being corrected such that a correction amount of the determination differential pressure at the time when the electronic control unit estimates that the amount of the separated particulate matter is large when the predetermined condition is satisfied is larger than a correction amount of the determination differential pressure at the time when the electronic control unit estimates that the amount of the separated particulate matter is small when the predetermined condition is satisfied, and the filter differential pressure being corrected such that a correction amount of the filter differential pressure at the time when the electronic control unit estimates that the amount of the separated particulate matter is large when the predetermined condition is satisfied is larger than a correction amount of the filter differential pressure at the time when the electronic control unit estimates that the amount of the separated particulate matter is small when the predetermined condition is satisfied.

18. The diagnostic system according to claim 17, wherein the electronic control unit is configured to, in the predetermined period, correct at least one of the determination differential pressure and the filter differential pressure, the determination differential pressure being corrected such that a correction amount of the determination differential pressure at the time when a temperature of the filter at a point in time at which the predetermined condition is satisfied is high is larger than a correction amount of the determination differential pressure at the time when the temperature of the filter is low at the point in time at which the predetermined condition is satisfied, and the filter differential pressure being corrected such that a correction amount of the filter differential pressure at the time when a temperature of the filter at a point in time at which the predetermined condition is satisfied is high is larger than a correction amount of the filter differential pressure at the time when the temperature of the filter is low at the point in time at which the predetermined condition is satisfied.

19. The diagnostic system according to claim 17, wherein the electronic control unit is configured to, in the predetermined period, correct at least one of the determination differential pressure and the filter differential pressure, the determination differential pressure being corrected such that a correction amount of the determination differential pressure at the time when the first estimated amount at a point in time at which the predetermined condition is satisfied is large is larger than a correction amount of the determination differential pressure at the time when the first estimated amount at the point in time at which the predetermined condition is satisfied is small, and the filter differential pressure being corrected such that a correction amount of the filter differential pressure at the time when the first estimated amount at a point in time at which the predetermined condition is satisfied is large is larger than a correction amount of the filter differential pressure at the time when the first estimated amount at the point in time at which the predetermined condition is satisfied is small.

20. The diagnostic system according to claim 17, wherein the electronic control unit is configured to calculate a second estimated amount, the second estimated amount being an estimated amount of urea water-originated deposit accumulated in the filter, and the electronic control unit is configured to, in the predetermined period, correct at least one of the determination differential pressure and the filter differential pressure, the determination differential pressure being corrected such that a correction amount of the determination differential pressure at the time when the second estimated amount at a point in time at which the predetermined condition is satisfied is large is larger than a correction amount of the determination differential pressure at the time when the second estimated amount at the point in time at which the predetermined condition is satisfied is small, and the filter differential pressure being corrected such that a correction amount of the filter differential pressure at the time when the second estimated amount at a point in time at which the predetermined condition is satisfied is large is larger than a correction amount of the filter differential pressure at the time when the second estimated amount at the point in time at which the predetermined condition is satisfied is small.

* * * * *